(12) United States Patent
Hara et al.

(10) Patent No.: US 8,590,138 B2
(45) Date of Patent: Nov. 26, 2013

(54) METHOD OF MANUFACTURING THERMALLY-ASSISTED MAGNETIC RECORDING HEAD

(75) Inventors: Shinji Hara, Tokyo (JP); Koji Shimazawa, Tokyo (JP); Ryo Hosoi, Tokyo (JP)

(73) Assignees: TDK Corporation, Tokyo (JP); SAE Magnetics (H.K.), Hong Kong (CN)

( * ) Notice: Subject to any disclaimer, the term of this patent is extended or adjusted under 35 U.S.C. 154(b) by 148 days.

(21) Appl. No.: 13/404,704

(22) Filed: Feb. 24, 2012

(65) Prior Publication Data
US 2013/0219698 A1 Aug. 29, 2013

(51) Int. Cl.
*G11B 5/127* (2006.01)
*H04R 31/00* (2006.01)

(52) U.S. Cl.
USPC ..................... 29/603.01; 29/603.03

(58) Field of Classification Search
USPC ............. 29/603.01, 603.03; 369/30.01, 30.02
See application file for complete search history.

(56) References Cited

U.S. PATENT DOCUMENTS

| | | | |
|---|---|---|---|
| 5,481,082 A * | 1/1996 | Yamamoto | 219/121.63 |
| 7,804,655 B2 * | 9/2010 | Shimazawa et al. | 360/59 |
| 7,974,043 B2 * | 7/2011 | Shimazawa et al. | 360/125.31 |
| 8,149,653 B2 * | 4/2012 | Shimazawa et al. | 369/13.33 |
| 8,179,747 B1 * | 5/2012 | Mugino et al. | 369/13.33 |
| 8,223,597 B2 * | 7/2012 | Komura et al. | 369/13.33 |
| 8,248,892 B2 * | 8/2012 | Shimazawa et al. | 369/13.32 |
| 8,248,895 B2 * | 8/2012 | Shimazawa et al. | 369/13.33 |
| 8,248,897 B2 * | 8/2012 | Shimazawa et al. | 369/13.33 |
| 8,274,867 B2 * | 9/2012 | Mori et al. | 369/13.33 |
| 8,310,903 B1 * | 11/2012 | Takayama et al. | 369/30.01 |
| 8,393,074 B1 * | 3/2013 | Takayama et al. | 29/603.12 |
| 8,406,091 B2 * | 3/2013 | Shimazawa et al. | 369/13.33 |
| 8,411,535 B1 * | 4/2013 | Hirano et al. | 369/13.32 |
| 8,424,191 B2 * | 4/2013 | Shimazawa et al. | 29/603.1 |
| 8,437,237 B2 * | 5/2013 | Komura et al. | 369/112.03 |
| 8,477,570 B2 * | 7/2013 | Arai et al. | 369/13.33 |
| 2008/0043360 A1 * | 2/2008 | Shimazawa et al. | 360/59 |
| 2009/0052078 A1 * | 2/2009 | Tanaka et al. | 360/59 |

FOREIGN PATENT DOCUMENTS

| JP | A-07-037911 | 2/1995 |
|---|---|---|
| JP | A-2008-047268 | 2/2008 |
| JP | A-2008-059694 | 3/2008 |

OTHER PUBLICATIONS

U.S. Appl. No. 13/222,795, filed Aug. 31, 2011.

* cited by examiner

*Primary Examiner* — David Angwin
(74) *Attorney, Agent, or Firm* — Oliff & Berridge, PLC

(57) ABSTRACT

A method of manufacturing a thermally-assisted magnetic recording head includes: providing a bar and a plurality of light source units, the bar including a plurality of thermally-assisted magnetic recording head sections arranged in a first direction, and each of the light source units including a substrate and a light source; and bonding a second surface of the substrate to the bar with an adhesive layer in between, where the plurality of light source units are so aligned to the respective thermally-assisted magnetic recording head sections on the bar, as to allow a first surface of the substrate, which supports the light source, to be parallel to the first direction, the bonding allowing the substrates of the light source units to be irradiated with a first laser beam and allowing the bar to be irradiated with a second laser beam, to thereby allow the adhesive layer to be melted.

8 Claims, 15 Drawing Sheets

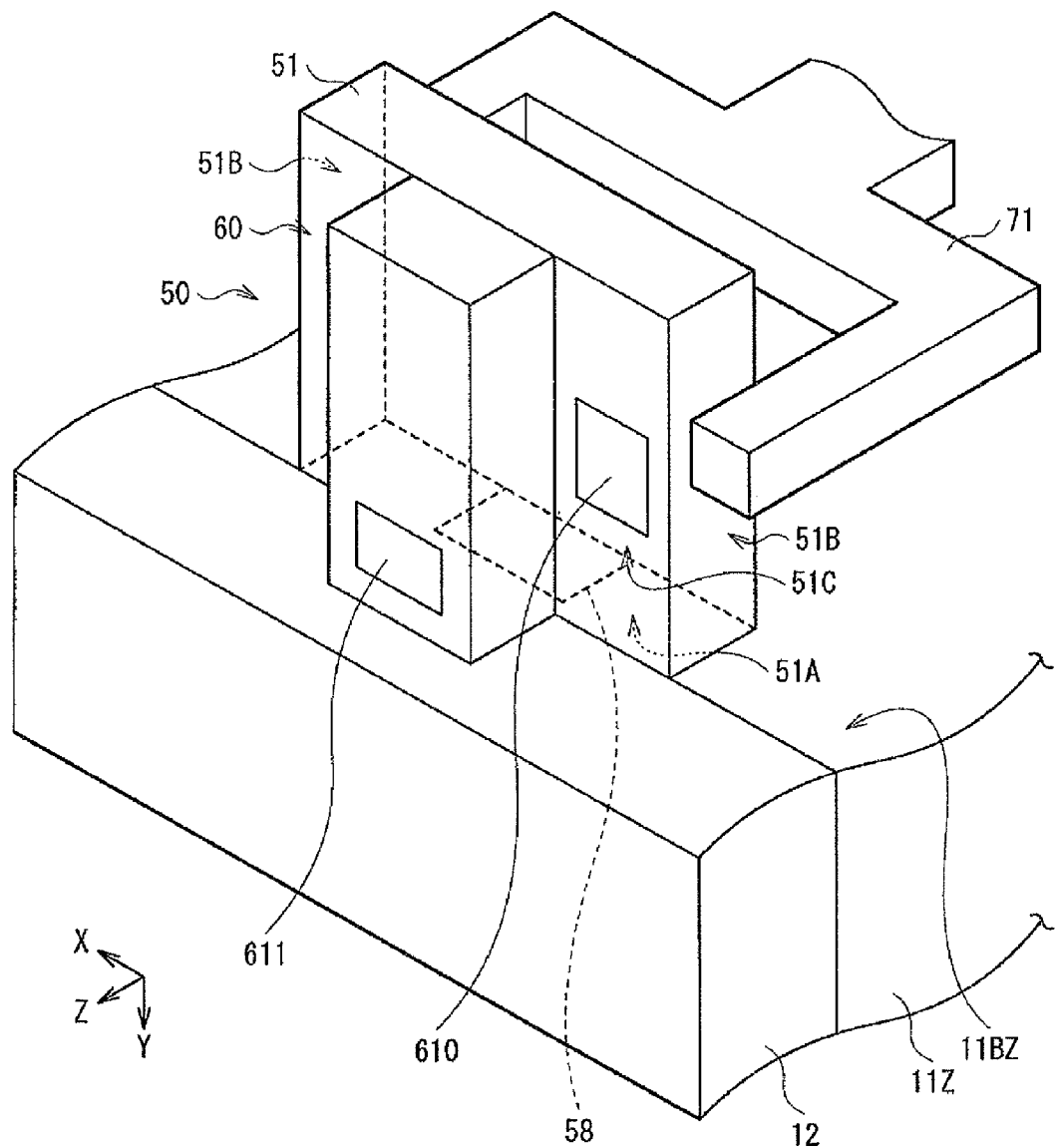
F I G. 14

METHOD OF MANUFACTURING THERMALLY-ASSISTED MAGNETIC RECORDING HEAD

BACKGROUND OF THE INVENTION

1. Field of the Invention

The present invention relates to a method of manufacturing a thermally-assisted magnetic recording head used in thermally-assisted magnetic recording in which near-field light is applied to a magnetic recording medium to lower a coercivity thereof so as to record information.

2. Description of Related Art

A magnetic disk unit in the related art is used for writing and reading magnetic information (hereinafter, simply referred to as information). The magnetic disk unit is provided with, in the housing thereof, a magnetic disk in which information is stored, and a magnetic read write head which records information into the magnetic disk and reproduces information stored in the magnetic disk. The magnetic disk is supported by a rotary shaft of a spindle motor, which is fixed to the housing, and rotates around the rotary shaft. On the other hand, the magnetic read write head is formed on a side surface of a magnetic head slider provided on one end of a suspension, and the magnetic read write head includes a magnetic write element and a magnetic read element which have an air bearing surface (ABS) facing the magnetic disk. In particular, as the magnetic read element, a magneto-resistive (MR) element exhibiting magneto-resistive effect is generally used. The other end of the suspension is attached to an end of an arm which is rotatably supported by a fixed shaft installed upright in the housing.

When the magnetic disk unit is not operated, namely, when the magnetic disk does not rotate, the magnetic read write head is not located over the magnetic disk and is pulled off to the position away from the magnetic disk (unload state). When the magnetic disk unit is driven and the magnetic disk starts to rotate, the magnetic read write head is changed to a state where the magnetic read write head is located at a predetermined position over the magnetic disk together with the suspension (load state). When the rotation number of the magnetic disk reaches a predetermined number, the magnetic head slider is stabilized in a state of slightly floating over the surface of the magnetic disk due to the balance of positive pressure and negative pressure. Thus, the information is accurately recorded and reproduced.

In recent years, with a progress in higher recording density (higher capacity) of the magnetic disk, an improvement in performance of the magnetic read write head and the magnetic disk has been demanded. The magnetic disk is a discontinuous medium including collected magnetic microparticles, and each magnetic microparticle has a single-domain structure. In the magnetic disk, one recording bit is configured by a plurality of magnetic microparticles. Since the asperity of a boundary between adjacent recording bits is necessary to be small in order to increase the recording density, the magnetic microparticles need to be made small. However, if the magnetic microparticles are small in size, thermal stability of the magnetization of the magnetic microparticles is lowered with decreasing the volume of the magnetic microparticles. To solve the issue, increasing magnetic anisotropy energy of the magnetic microparticle is effective. However, increasing the magnetic anisotropy energy of the magnetic microparticle leads to increase in the coercivity of the magnetic disk. As a result, difficulty occurs in the information recording using the existing magnetic head.

As a method to solve the above-described difficulty, a so-called thermally-assisted magnetic recording has been proposed. In the method, a magnetic recording medium with large coercivity is used, and when information is written, heat is applied together with the magnetic field to a portion of the magnetic recording medium where the information is recorded to increase the temperature and to lower the coercivity, thereby recording the information. Hereinafter, the magnetic head used in the thermally-assisted magnetic recording is referred to as a thermally-assisted magnetic recording head.

In the thermally-assisted magnetic recording, near-field light is generally used for applying heat to a magnetic recording medium. As a method of generating near-field light, a method using a near-field light probe that is a metal strip, namely, so-called plasmon generator, is generally known. In the plasmon generator, plasmons are generated by excitation by incident light from the outside, and as a result, near-field light is generated. As for the arrangement of the light source which is required to supply the incident light from the outside, various configurations have been proposed up to now. The applicant has been proposed a thermally-assisted magnetic recording head having a "composite slider structure" in which a light source unit including a laser oscillator is bonded to a surface of the slider formed with a magnetic write element which is opposite to the surface of the ABS. The "composite slider structure" is disclosed in U.S. Patent Application Publication No. 2008/043360 specification and U.S. Patent Application Publication No. 2009/052078 specification.

In the method of performing thermally-assisted magnetic recording with use of a plasmon generator, it is important to stably supply light with sufficient intensity to a desired position on the magnetic recording medium. Therefore, it is necessary to secure high alignment accuracy for fixing a light source unit to a slider. Reduction in alignment accuracy causes reduction in heating efficiency with respect to a magnetic recording medium, and it is a serious issue in the thermally-assisted magnetic recording. From these reasons, it is desirable to provide a thermally-assisted magnetic recording head which has a compact configuration, is excellent in write efficiency, and is easily manufactured. Moreover, it is also desirable to provide a simple method of manufacturing such a thermally-assisted magnetic recording head.

SUMMARY OF THE INVENTION

According to an embodiment of the invention, there is provided a method of manufacturing a thermally-assisted magnetic recording head, the method including: (1) providing a bar and a plurality of light source units, the bar including a plurality of thermally-assisted magnetic recording head sections arranged in a first direction that is a longitudinal direction, and each of the light source units including a substrate and a light source mounted on the substrate; (2) bonding a second surface of the substrate to the bar with an adhesive layer in between, where the plurality of light source units are so aligned to the respective thermally-assisted magnetic recording head sections on the bar, as to allow a first surface of the substrate, which supports the light source, to be parallel to the first direction, the bonding allowing the substrates of the light source units to be irradiated with a first laser beam and allowing the bar to be irradiated with a second laser beam, to thereby allow the adhesive layer to be melted; and (3) separating the bar into a plurality of sliders each including one of the thermally-assisted magnetic recording head sections.

In the method of manufacturing the thermally-assisted magnetic recording head according to the embodiment of the invention, to bond the second surface of the substrate and the bar, the first and second laser beams are applied to the substrate and the bar, respectively, to melt the adhesive layer between the second surface of the substrate and the bar. Therefore, the thermally-assisted magnetic recording head sections provided on the bar are more tightly bonded without being adversely affected by the irradiation with the laser beams. In addition, the bonding process is performed instantly so that improvement of positional accuracy is achievable.

In the method of manufacturing the thermally-assisted magnetic recording head according to the embodiment of the invention, the irradiation of the substrate with the first laser beam is preferably initiated while the irradiation of the bar with the second laser beam is continued. In this case, the irradiation of the substrates with the first laser beam is preferably ended on ending of the irradiation of the bar with the second laser beam, or is preferably ended after the ending of the irradiation of the bar with the second laser beam.

BRIEF DESCRIPTION OF THE DRAWINGS

FIG. 14 is a perspective view illustrating a process following the process of FIG. 13.

DETAILED DESCRIPTION OF THE PREFERRED EMBODIMENTS

Hereinafter, a preferred embodiment of the invention will be described in detail with reference to drawings.

[1. Configuration of Magnetic Disk Unit]

First, referring to FIG. 1 and FIG. 2, a configuration of a magnetic disk unit will be described below as an embodiment of the invention.

Figure 1:
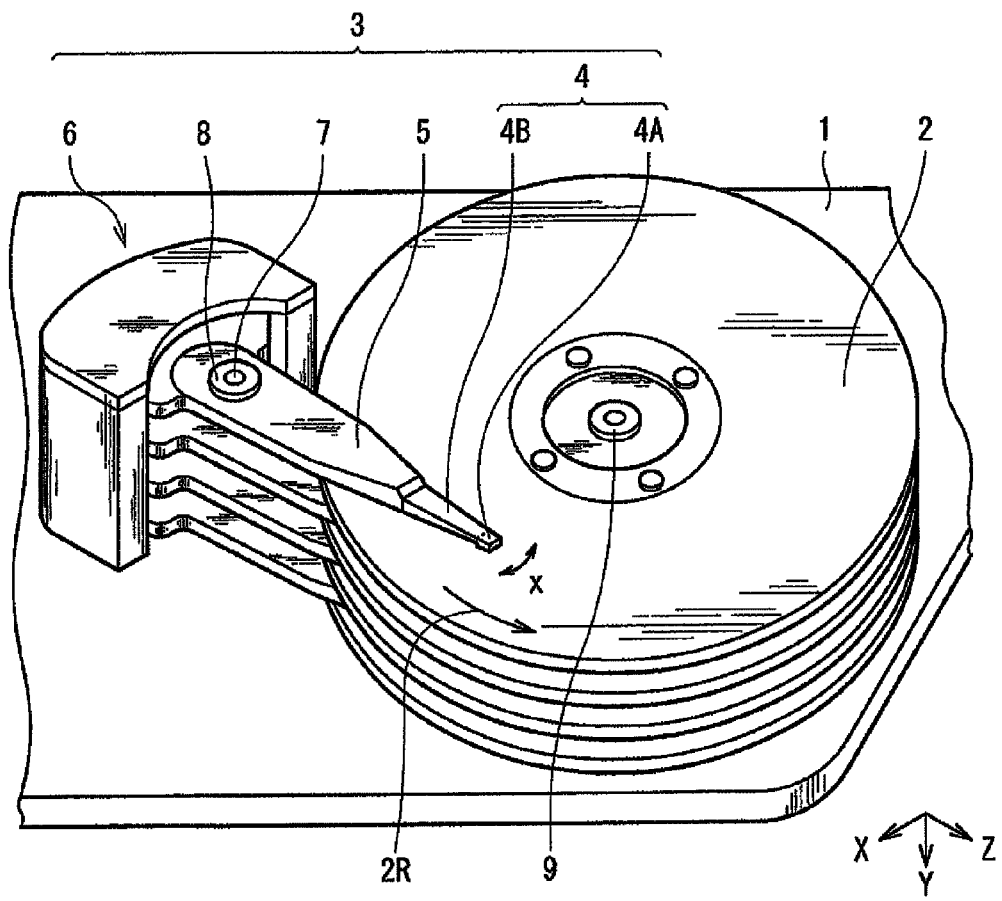
FIG. 1 is a perspective view illustrating a configuration of a magnetic disk unit provided with a thermally-assisted magnetic head device according to an embodiment of the invention.

FIG. 1 is a perspective view illustrating an internal configuration of the magnetic disk unit as the embodiment. The magnetic disk unit adopts load/unload system as a driving system, and includes, in a housing 1, a magnetic disk 2 as a magnetic recording medium in which information is to be written, and a head arm assembly (HAA) 3 for writing information in the magnetic disk 2 and reading the information. The HAA 3 is provided with a head gimbals assembly (HGA) 4, an arm 5 supporting a base of the HGA 4, and a driver 6 as a power source for rotating the arm 5. The HGA 4 includes a thermally-assisted magnetic head device (hereinafter, simply referred to as a "magnetic head device") 4A having a side surface provided with a magnetic read write head section 10 (described later) according to the embodiment, and a suspension 4B having an end provided with the magnetic head device 4A. The arm 5 supports the other end of the suspension 4B (an end opposite to the end provided with the magnetic head device 4A). The arm 5 is configured so as to be rotatable, through a bearing 8, around a fixed shaft 7 fixed to the housing 1. The driver 6 is configured of, for example, a voice coil motor. Incidentally, the magnetic disk unit has a plurality of (four in FIG. 1) magnetic disks 2, and the magnetic head device 4A is disposed corresponding to recording surfaces (a front surface and a back surface) of each of the magnetic disks 2. Each magnetic head device 4A is allowed to move in a direction across write tracks, that is, in a track width direction (in X-axis direction) in a plane parallel to the recording surface of each magnetic disk 2. On the other hand, the magnetic disk 2 is configured to rotate around a spindle motor 9 fixed to the housing 1 in a rotation direction 2R substantially orthogonal to the X-axis direction. With the rotation of the magnetic disk 2 and the movement of the magnetic head device 4A, information is written into the magnetic disk 2 or stored information is read out from the magnetic disk 2. Further, the magnetic disk unit has a control circuit (described later) which controls a write operation and a read operation of the magnetic read write head section 10, and controls an emission operation of a laser diode as a light source which generates laser light used for thermally-assisted magnetic recording (described later).

Figure 2:
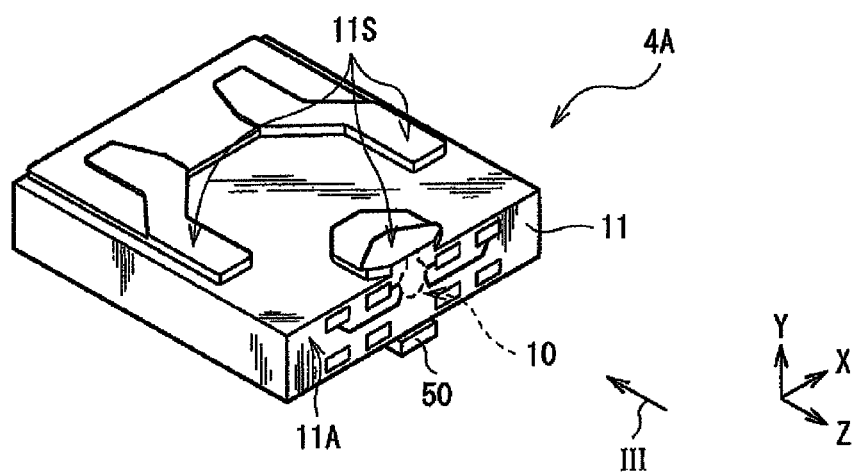
FIG. 2 is a perspective view illustrating a configuration of the thermally-assisted magnetic head device illustrated in FIG. 1.

FIG. 2 illustrates a configuration of the magnetic head device 4A illustrated in FIG. 1. The magnetic head device 4A has a block-shaped slider 11 made of, for example, $Al_2O_3$.TiC (AlTiC). The slider 11 is substantially formed as a hexahedron, for example, and one surface thereof corresponds to an ABS 11S disposed oppositely and proximally to the recording surface of the magnetic disk 2. When the magnetic disk unit is not driven, namely, when the spindle motor 9 is stopped and the magnetic disk 2 does not rotate, the magnetic head device 4A is pulled off to the position away from the magnetic disk 2 (unload state), in order to prevent contact of the ABS 11S and the recording surface. In contrast, when the magnetic disk unit is initiated, the magnetic disk 2 starts to rotate at a high speed by the spindle motor 9, and the arm 5 is rotationally moved around the fixed shaft 7 by the driver 6. Therefore, the magnetic head device 4A moves above the front surface of the magnetic disk 2, and is in a load state. The rotation of the magnetic disk 2 at a high speed leads to air flow between the recording surface and the ABS 11S, and lift force caused by the air flow leads to a state where the magnetic head device 4A floats to maintain a certain distance (magnetic spacing) MS (in FIG. 5 described later) along a direction (Y-axis direction) orthogonal to the recording surface. In addition, on the element forming surface 11A that is one side surface orthogonal to the ABS 11S, the magnetic read write head section 10 is provided. Incidentally, on a surface 11B opposite to the ABS 11S of the slider 11, a light source unit 50 is provided near the magnetic read write head section 10.

[2. Detailed Configuration of Magnetic Read Write Head Section]

Next, the magnetic read write head section 10 is described in more detail with reference to FIG. 3 to FIG. 5.

Figure 3:
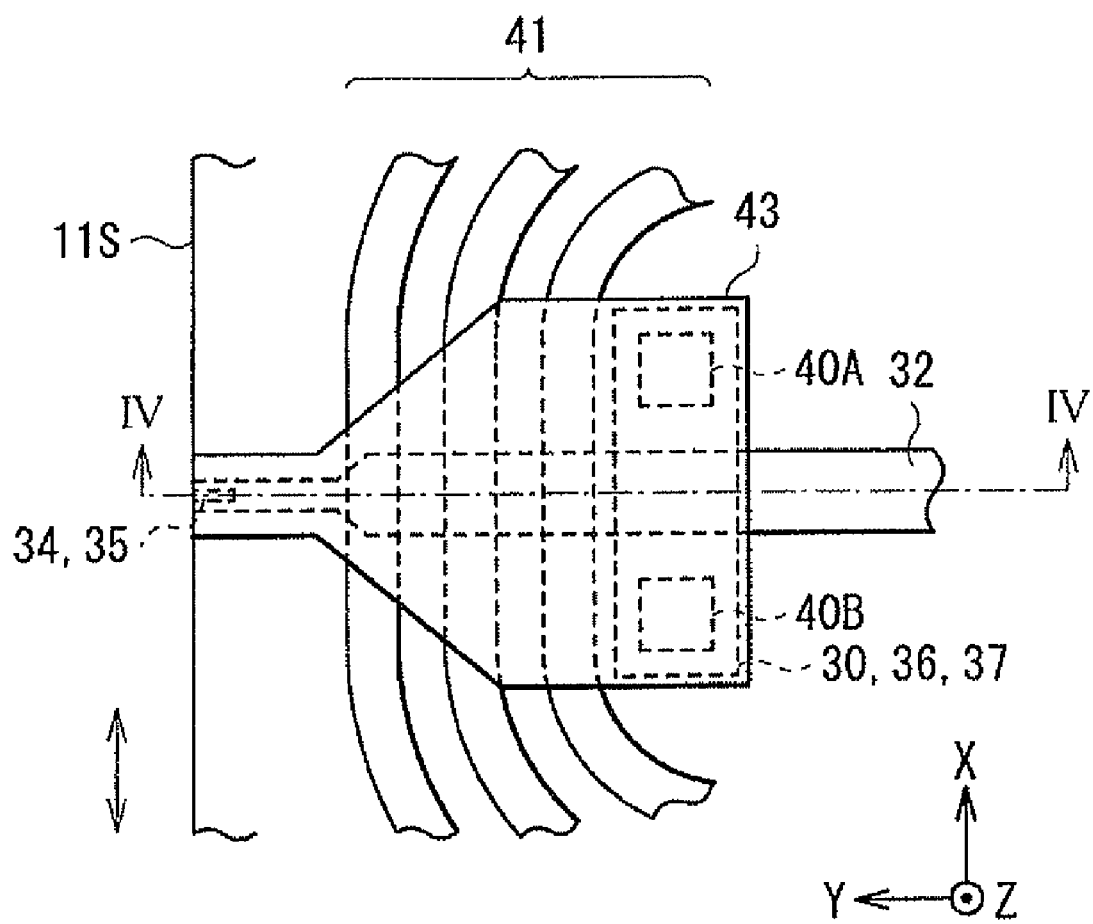
FIG. 3 is a plan view illustrating a configuration of a main part of a magnetic read write head section viewed from an arrow III direction illustrated in FIG. 2.
Figure 4:
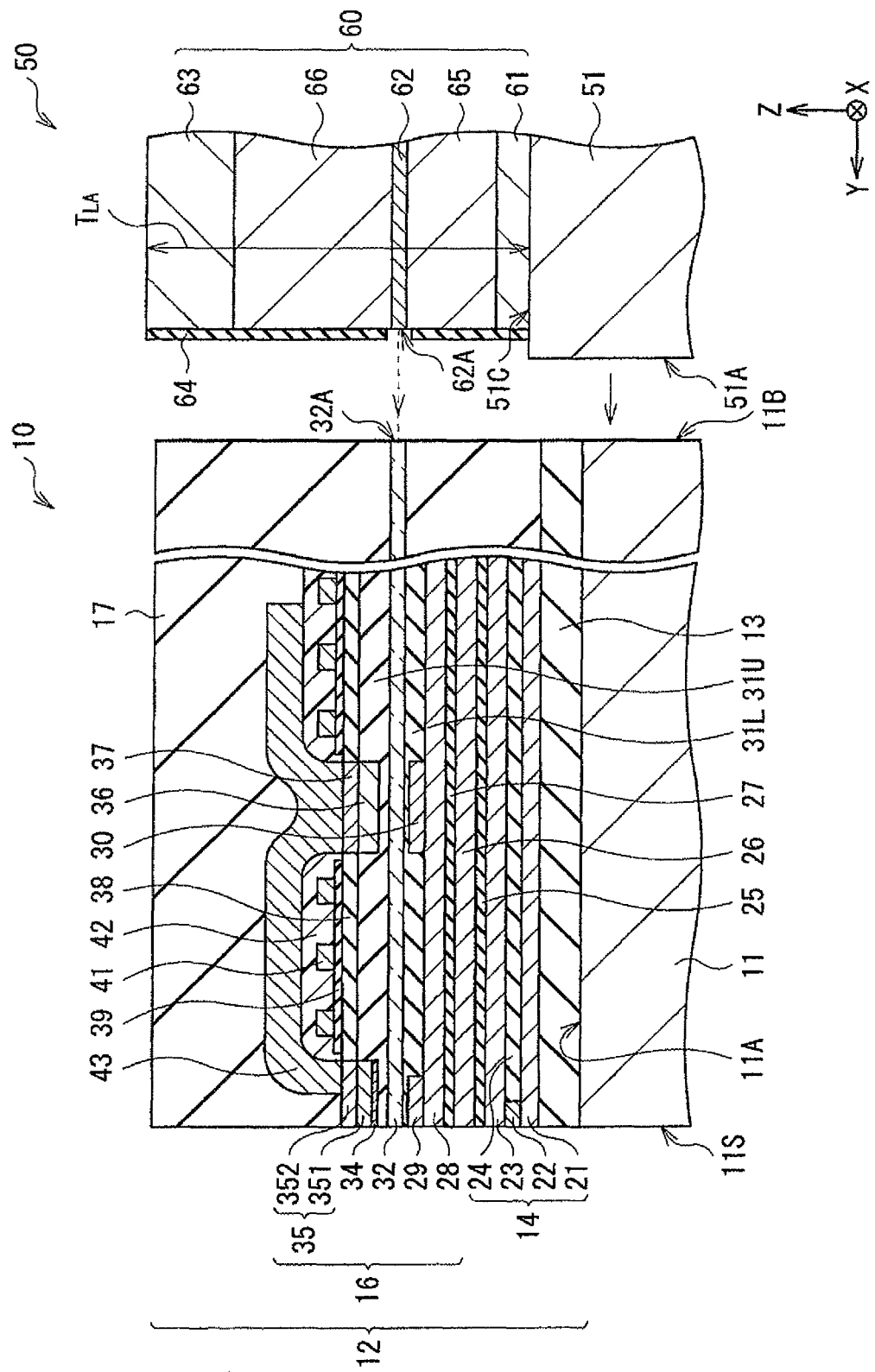
FIG. 4 is a sectional view illustrating a configuration of the magnetic read write head section viewed from an arrow direction along a IV-IV line illustrated in FIG. 3.
Figure 5:
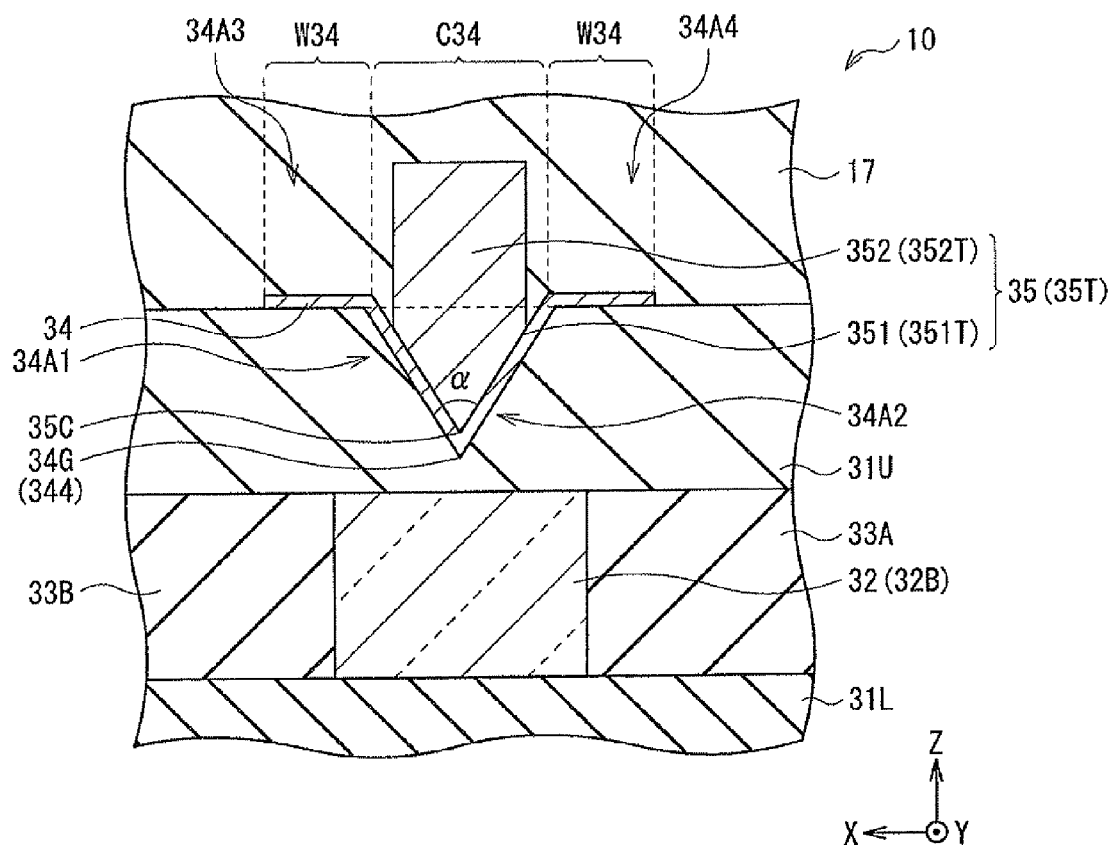
FIG. 5 is a plan view illustrating a configuration of an end surface exposed on an air bearing surface, of the main part of the magnetic read write head section.

FIG. 3 is a plan view of the magnetic read write head section 10 viewed from a direction of an arrow III illustrated in FIG. 2, FIG. 4 is a sectional view illustrating a configuration thereof in an arrow direction along a IV-IV line illustrated in FIG. 3, and FIG. 5 illustrates a part of an end surface, exposed on the ABS 11S, of the magnetic read write head section 10 in an enlarged manner. The magnetic read write head section 10 has a stacked structure including an insulating layer 13, a read head section 14, a write head section 16, and a cladding layer 17 which are embedded in an element forming layer 12 provided on a base 11 and are stacked in order on the base 11. Each of the read head section 14 and the write head section 16 has an end surface exposed on the ABS 11S.

The read head section 14 performs a read process using magneto-resistive effect (MR). The read head section 14 is configured by stacking, for example, a lower shield layer 21, an MR element 22, and an upper shield layer 23 in order on the insulating layer 13.

The lower shield layer 21 and the upper shield layer 23 are respectively formed of a soft magnetic metal material such as NiFe (nickel iron alloy), and are disposed to face each other with the MR element 22 in between in the stacking direction (in Z-axis direction). As a result, the lower shield layer 21 and the upper shield layer 23 each exhibit a function to protect the MR element 22 from the influence of unnecessary magnetic field.

One end surface of the MR element 22 is exposed on the ABS 11S, and the other end surfaces thereof are in contact with an insulating layer 24 filling a space between the lower shield layer 21 and the upper shield layer 23. The insulating layer 24 is formed of an insulating material such as $Al_2O_3$ (aluminum oxide), AlN (aluminum nitride), $SiO_2$ (silicon dioxide), and DLC (diamond-like carbon).

The MR element 22 functions as a sensor for reading magnetic information written in the magnetic disk 2. Note that in the embodiment, in a direction (Y-axis direction) orthogonal to the ABS 11S, a direction toward the ABS 11S with the MR element 22 as a base or a position near the ABS 11S is called "front side". A direction toward opposite side from the ABS 11S with the MR element 22 as a base or a position away from the ABS 11S is called "back side". The MR element 22 is, for example, a CPP (current perpendicular to plane)-GMR (giant magnetoresistive) element whose sense current flows inside thereof in a stacking direction. The lower shield layer 21 and the upper shield layer 23 each function as an electrode to supply the sense current to the MR element 22.

In the read head section 14 with such a structure, a magnetization direction of a free layer (not illustrated) included in the MR element 22 changes depending on a signal magnetic field from the magnetic disk 2. Thus, the magnetization direction of the free layer shows a change relative to a magnetization direction of a pinned layer (not illustrated) also included in the MR element 22. When the sense current is allowed to flow through the MR element 22, the relative change in the magnetization direction appears as the change of the electric resistance. Therefore, the read head section 14 detects the signal magnetic field using the change to read the magnetic information.

On the read head section 14, an insulating layer 25, an intermediate shield layer 26, and an insulating layer 27 are stacked in order. The intermediate shield layer 26 functions to prevent the MR element 22 from being affected by a magnetic field which is generated in the write head section 16, and is formed of, for example, a soft magnetic metal material such as NiFe. The insulating layers 25 and 27 are formed of the similar material to the insulating layer 24.

The write head section 16 is a vertical magnetic recording head performing a recording process of thermally-assisted magnetic recording system. The write head section 16 has, for example, a lower yoke layer 28, a leading shield 29 and a connecting layer 30, a cladding 31L, a waveguide 32, claddings 33A and 33B, and a cladding 31U in order on the insulating layer 27. The claddings 33A and 33B configure a first cladding pair sandwiching the waveguide 32 in the track-width direction (in the X-axis direction). On the other hand, the claddings 31L and 31U configure a second cladding pair sandwiching the waveguide 32 in the thickness direction (in the Z-axis direction). Note that the leading shield 29 may be omitted from the structure.

The waveguide 32 is formed of a dielectric material allowing laser light to pass therethrough. Examples of the constituent material of the waveguide 32 include SiC, DLC, TiOx (titanium oxide), TaOx (tantalum oxide), SiNx (silicon nitride), SiOxNy (silicon oxynitride), Si (silicon), ZnSe (zinc selenide), NbOx (niobium oxide), GaP (gallium phosphide), ZnS (zinc sulfide), ZnTe (zinc telluride), CrOx (chromium oxide), FeOx (iron oxide), CuOx (copper oxide), SrTiOx (strontium titanate), BaTiOx (barium titanate), Ge (germanium), and C (diamond). The claddings 33A, 33B, 31L, and 31U are formed of a dielectric material having a refractive index, with respect to laser light propagating through the waveguide 32, lower than that of a constituent material of the waveguide 32. In terms of the refractive index with respect to laser light propagating through the waveguide 32, the dielectric material constituting the claddings 33A and 33B and the dielectric material constituting the claddings 31L and 31U may be the same or different from each other. Examples of the dielectric material constituting the claddings 33A, 33B, 31L, and 31U include SiOx (silicon oxide), $Al_2O_3$ (aluminum oxide), AlN (aluminum nitride), and $Al_2O_3$.

The lower yoke layer 28, the leading shield 29, and the connecting layer 30 are each made of a soft magnetic metal material such as NiFe. The leading shield 29 is located at the frontmost end of the upper surface of the lower yoke layer 28 so that one end surface of the leading shield 29 is exposed on the ABS 11S. The connecting layer 30 is located at the rear of the leading shield 29 on the upper surface of the lower yoke layer 28. The cladding 31L is made of a dielectric material having a refractive index, with respect to laser light propagating through the waveguide 32, lower than that of the waveguide 32, and is provided to cover the lower yoke layer 28, the leading shield 29, and the connecting layer 30. The waveguide 32 provided on the cladding 31L extends in a direction (Y-axis direction) orthogonal to the ABS 11S, one end surface of the waveguide 32 is exposed on the ABS 11S, and the other end surface is exposed at the backward thereof. Note that the front end surface of the waveguide 32 may be located at a receded position from the ABS 11S without being exposed on the ABS 11S. In the waveguide 32, the shape of a cross-section parallel to the ABS 11S is, for example, a rectangular shape, but may be the other shapes.

The write head section 16 further includes a plasmon generator 34 provided above the front end of the waveguide 32 through the cladding 31U, and a magnetic pole 35 provided to be in contact with the upper surface of the plasmon generator 34. The plasmon generator 34 and the magnetic pole 35 are arranged so that one end surface of each of the plasmon generator 34 and the magnetic pole 35 is exposed on the ABS 11S. The magnetic pole 35 has a structure in which a first layer 351 and a second layer 352 are stacked in order on the plasmon generator 34, for example. Both the first layer 351 and the second layer 352 are formed of a magnetic material with high saturation flux density such as iron-based alloy. Examples of the iron-based alloy include FeCo (iron cobalt alloy), FeNi (iron nickel alloy), and FeCoNi (iron cobalt nickel alloy). The plasmon generator 34 generates near-field light NF (described later) from the ABS 11S, based on the laser light which has propagated through the waveguide 32. The magnetic pole 35 stores therein magnetic flux generated in a coil 41 (described later), releases the magnetic flux from the ABS 11S, thereby generating a write magnetic field for writing magnetic information into the magnetic disk 2. The plasmon generator 34 and the first layer 351 are embedded in the clad 31U.

The write head section 16 further includes a connecting layer 36 embedded in the clad 31U at the rear of the plasmon generator 34 and the magnetic pole 35, and a connecting layer 37 provided to be in contact with the upper surface of the connecting layer 36. Both the connecting layers 36 and 37 are arranged above the connecting layer 30 and are formed of a soft magnetic metal material such as NiFe.

The write head section 16 includes two connecting sections 40A and 40B (FIG. 3) which are embedded in the claddings 31U, 33A, and 33B. The connecting sections 40A and 40B are also formed of a soft magnetic metal material such as NiFe. The connecting sections 40A and 40B extend in the Z-axis direction so as to connect the connecting layer 30 and the connecting layer 36, and are arranged in the X-axis direction so as to sandwich the waveguide 32 with a distance.

As illustrated in FIG. 4, on the cladding 31U, an insulating layer 38 is provided to fill a space around the second layer 352 of the magnetic pole 35. An insulating layer 39 and the coil 41 which is formed in spiral around the connecting layer 37 are stacked in order on the insulating layer 38. The coil 41 is intended to generate magnetic flux for writing by flow of a write current, and is formed of a high conductive material such as Cu (copper) and Au (gold). The insulating layers 38 and 39 are configured of an insulating material such as $Al_2O_3$, AlN, $SiO_2$ or DLC. The insulating layers 38 and 39 and the coil 41 are covered with an insulating layer 42, and an upper yoke layer 43 is further provided to cover the insulating layer 42. The insulating layer 42 is configured of, for example, a non-magnetic insulating material flowing on heating, such as a photoresist or a spin on glass (SOG). The insulating layers 38, 39, and 42 electrically separate the coil 41 from other nearby devices. The upper yoke layer 43 is formed of a soft magnetic material with high saturation flux density such as CoFe, the front portion thereof is connected to the second layer 352 of the magnetic pole 35, and a part of the rear portion is connected to the connecting layer 37. In addition, the front end surface of the upper yoke layer 43 is located at a receded position from the ABS 11S.

In the write head section 16 with such a structure, by the write current flowing through the coil 41, magnetic flux is generated inside a magnetic path which is mainly configured by the leading shield 29, the lower yoke layer 28, the connecting layer 30, the connecting sections 40A and 40B, the connecting layers 36 and 37, the upper yoke layer 43, and the magnetic pole 35. Accordingly, a signal magnetic field is generated near the end surface of the magnetic pole 35 exposed on the ABS 11S, and the signal magnetic field reaches a predetermined region of the recording surface of the magnetic disk 2.

Further, in the magnetic read write head section 10, for example, the cladding 17 made of similar material to the cladding 31U is formed to cover the entire upper surface of the write head section 16.

Figure 6:
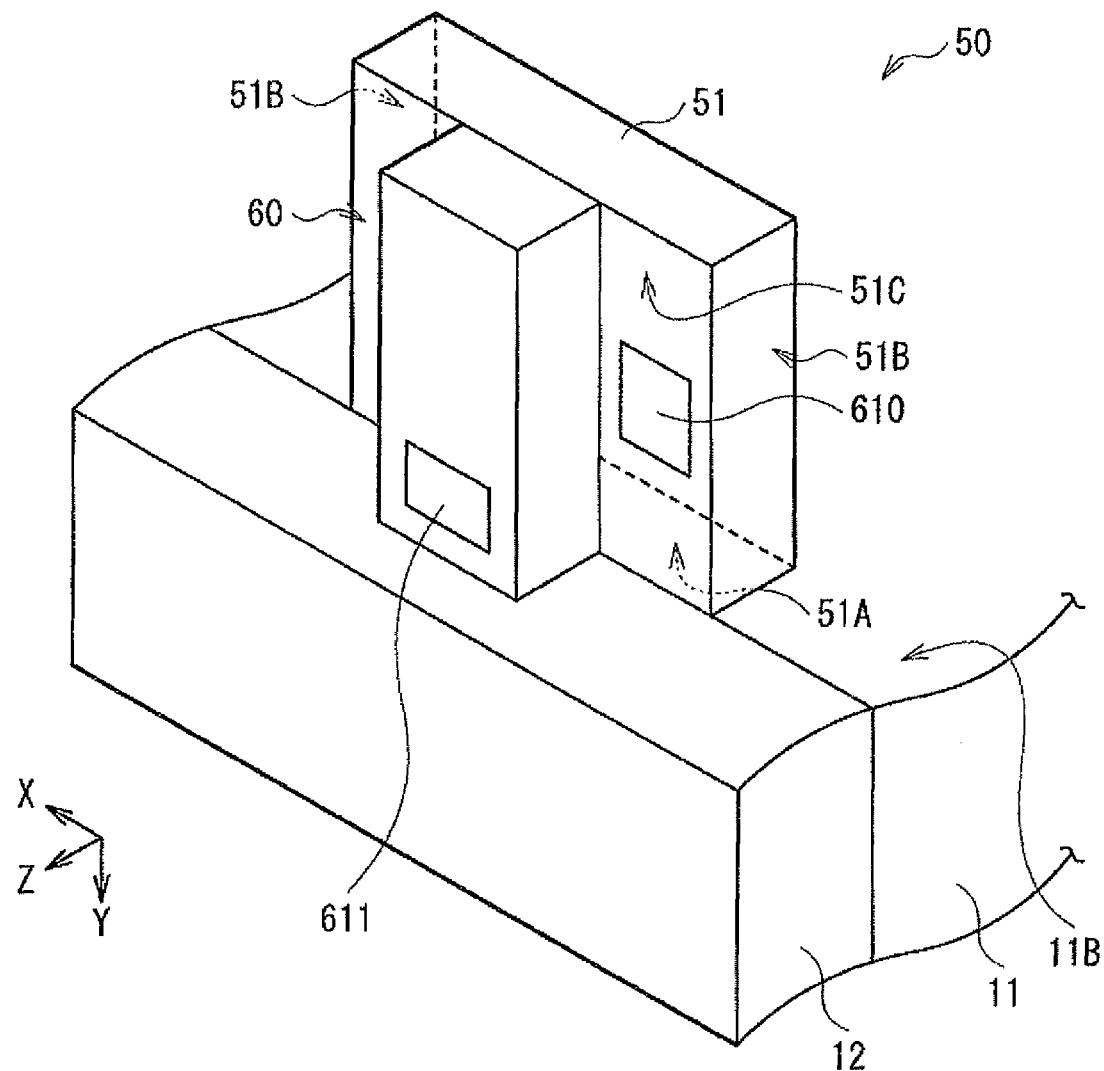
FIG. 6 is a perspective view illustrating a schematic overall configuration of a light source unit illustrated in FIG. 1.

The light source unit 50 provided at the rear of the magnetic read write head section 10 includes a laser diode 60 as a light source emitting laser light, and a rectangular-solid supporting member 51 supporting the laser diode 60, as illustrated in FIG. 6. Note that FIG. 6 is a perspective view illustrating a schematic overall configuration of the light source unit 50.

The supporting member 51 is formed of, for example, a ceramic material such as $Al_2O_3$.TiC, or Si (silicon). As illustrated in FIG. 4, the supporting member 51 includes a bonding surface 51A to be adhered to a back surface 11B of the slider 11, and a light source mounting surface 51C orthogonal to the bonding surface 51A. The light source mounting surface 51C is parallel to the element forming surface 11A, and the laser diode 60 is mounted on the light source mounting surface 51C. The supporting member 51 desirably has a function of a heatsink dissipating heat generated by the laser diode 60, in addition to the function to support the laser diode 60.

Laser diodes generally used for communication, for optical disc storage, or for material analysis, for example, InP-based, GaAs-based, or GaN-based laser diodes, may be used as the laser diode 60. The wavelength of the laser light emitted from the laser diode 60 may be any value within the range of, for example, 375 nm to 1.7 μm. Specifically, examples of such a laser diode include a laser diode of InGaAsP/InP quaternary mixed crystal with the emission wavelength region of 1.2 to 1.67 μm. As illustrated in FIG. 4, the laser diode 60 has a multilayer structure including a lower electrode 61, an active layer 62, and an upper electrode 63. For example, an n-type semiconductor layer 65 including n-type AlGaN is inserted between the lower electrode 61 and the active layer 62, and for example, a p-type semiconductor layer 66 including p-type AlGaN is inserted between the active layer 62 and the upper electrode 63. On each of two cleavage surfaces of the multilayer structure, a reflective layer 64 formed of $SiO_2$, $Al_2O_3$, or the like is provided to totally reflect light and excite oscillation. In the reflective layer 64, an aperture for emitting laser light is provided at a position including an emission center 62A of the active layer 62. The relative positions of the light source unit 50 and the magnetic read write head section 10 are fixed by adhering the bonding surface 51A of the supporting member 51 to the back surface 11B of the slider 11 so that the emission center 62A and the rear end surface 32A of the waveguide 32 are coincident with each other. The thickness $T_{LA}$ of the laser diode 60 is, for example, within a range of about 60 to 200 μm. A predetermined voltage is applied between the lower electrode 61 and the upper electrode 63 so that laser light is emitted from the emission center 62A of the active layer 62, and then enters the rear end surface 32A of the waveguide 32. The laser light emitted from the laser diode 60 is preferably polarized light of a TM mode whose electric field oscillates in a direction perpendicular to the surface of the active layer 62. The laser diode 60 may be driven with use of a power source in the magnetic disk unit. The magnetic disk unit generally includes a power source generating a voltage of about 5 V, for example, and the voltage generated by the power source is sufficient to drive the laser diode 60. In addition, the laser diode 60 consumes power of about several tens mW, which may be sufficiently covered by the power source in the magnetic disk unit.

Figure 7:
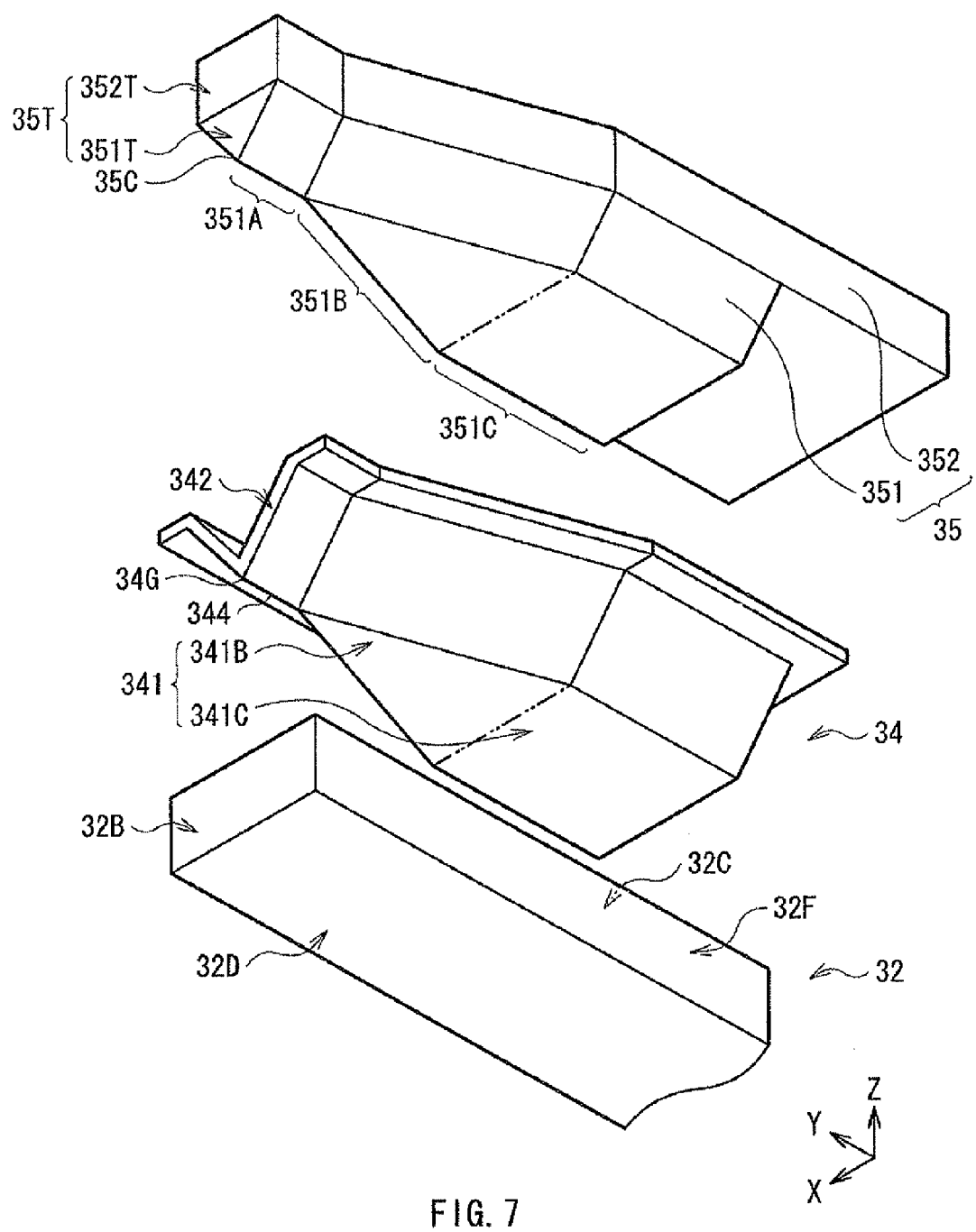
FIG. 7 is an exploded perspective view illustrating the configuration of the main part of the magnetic read write head section.
Figure 8:
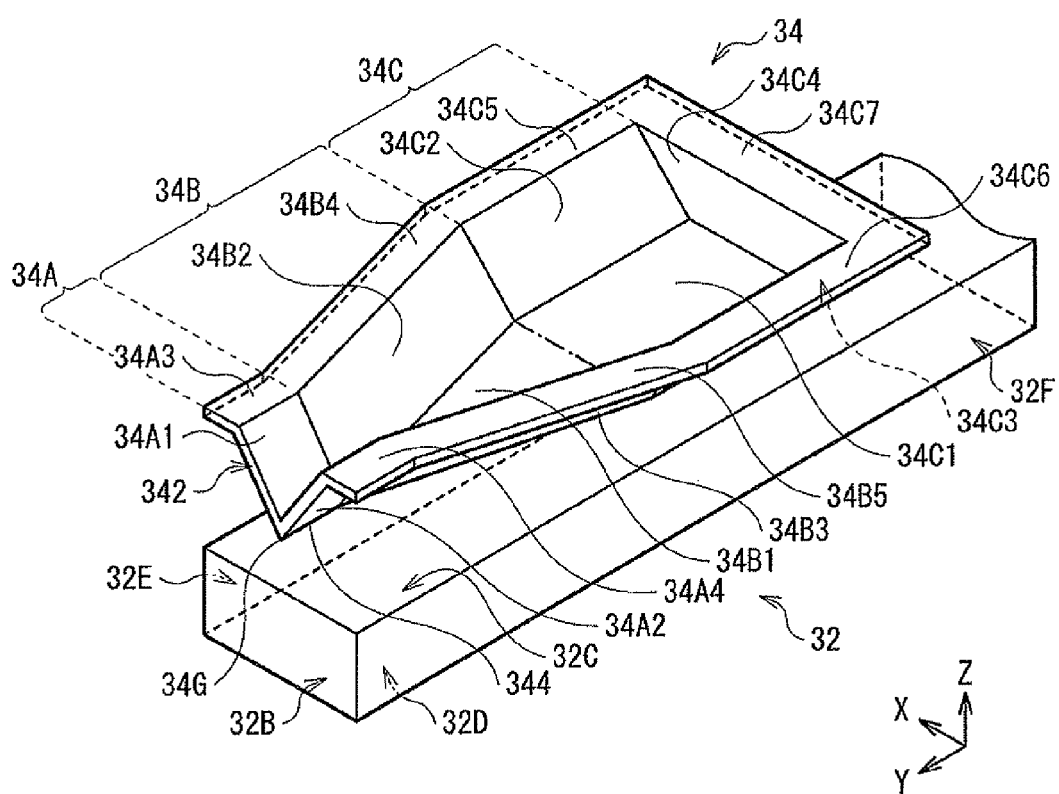
FIG. 8 is another perspective view illustrating the configuration of the main part of the magnetic read write head section.
Figure 9:
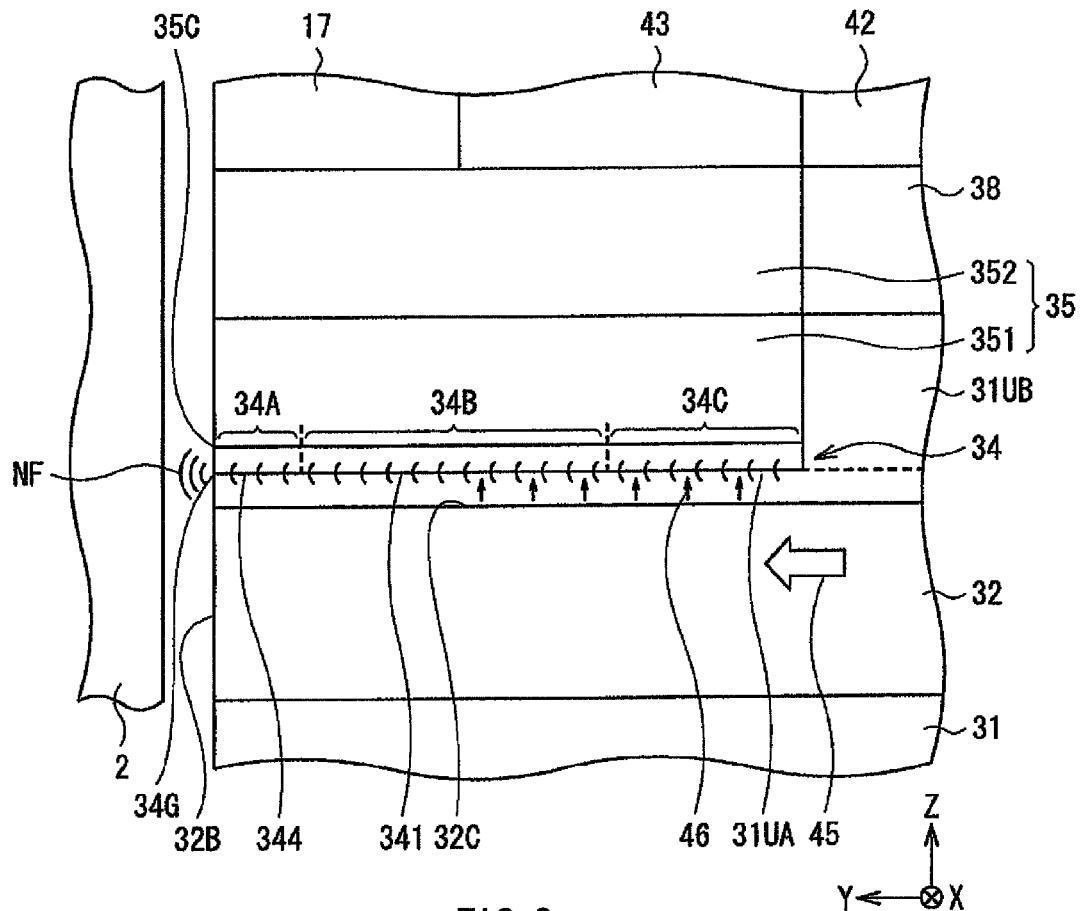
FIG. 9 is a sectional view illustrating a configuration of a cross-section perpendicular to the air bearing surface, of the main part of the magnetic read write head section.
Figure 10:
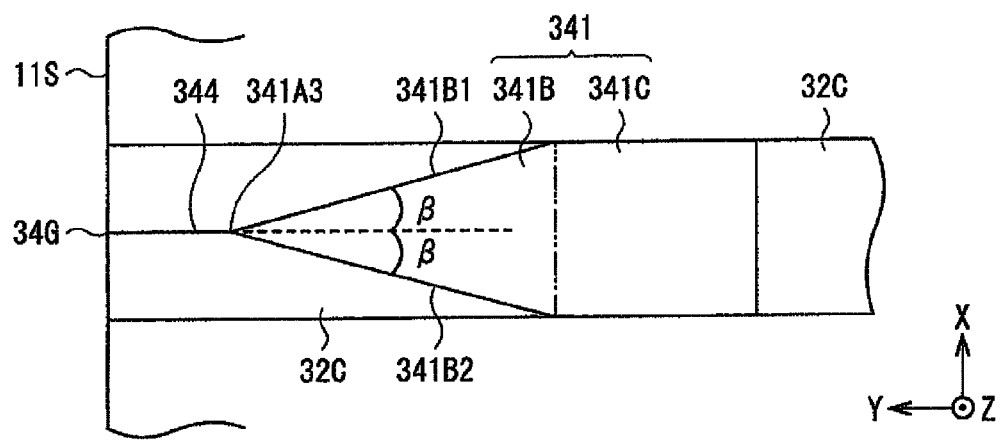
FIG. 10 is a plan view illustrating the main part of the magnetic read write head section.

Next, referring to FIG. 7 to FIG. 10 in addition to FIG. 5, the configurations and the functions of the waveguide 32, the plasmon generator 34, and the magnetic pole 35 will be described in detail. FIG. 7 is an exploded perspective view illustrating the configuration of the waveguide 32, the plasmon generator 34, and the magnetic pole 35, and FIG. 8 is a perspective view illustrating the shape and the positional relationship of the waveguide 32 and the plasmon generator 34. FIG. 9 is a sectional view illustrating the configurations and the functions of the waveguide 32, the plasmon generator 34, and the magnetic pole 35, and the illustrated cross-section is orthogonal to the ABS 11S. FIG. 10 is a plan view illustrating the main part of the plasmon generator 34 viewed from the top side.

As illustrated in FIG. 8, for example, the waveguide 32 includes an end surface 32B closer to the ABS 11S, an evanescent light generating surface 32C as an upper surface, a lower surface 32D, and two side surfaces 32E and 32F, besides the rear end surface 32A illustrated in FIG. 4. The evanescent light generating surface 32C generates evanescent light based on the laser light propagating through the waveguide 32. In FIG. 7 to FIG. 10, although the case where the end surface 32B is arranged on the ABS 11S is exemplified, the end surface 32B may be arranged at a position away from the ABS 11S.

As illustrated in FIG. 8, the plasmon generator 34 has a first portion 34A, a second portion 34B, and a third portion 34C in order from the ABS 11S side. In FIG. 8, the boundary between the second portion 34B and the third portion 34C is indicated by a chain line. Examples of the constituent material of the plasmon generator 34 include a conductive material including one or more of Pd (palladium), Pt (platinum), Rh (rhodium), Ir (iridium), Au (gold), Ag (silver), Cu (copper), and Al (aluminum). Here, the constituent materials of the lower layer 34L and the upper layer 34U may be the same kind or different kinds.

As illustrated in FIG. 5, the first portion 34A has a V-shaped mid-portion C34 including an edge 344 which is projected toward the waveguide on a section surface parallel to the ABS 11S, and a pair of wing portions W34 facing to each other with the mid-portion C34 in between in the track width direction (in the X-axis direction).

A V-shaped groove is provided in the mid-portion C34 of the first portion 34A. In other words, a pair of sidewalls 34A1 and 34A2 which respectively extend in a direction orthogonal to the ABS 11S is connected with each other at the edge 344 so as to form a V-shape having a vertex angle □ on a section surface parallel to the ABS 11S.

In the wing portions W34 of the first portion 34A, a pair of fringes 34A3 and 34A4 is provided so that one end of each of the fringes 34A3 and 34A4 in the X-axis direction is connected to an end portion on the opposite side from the edge 344 of the sidewalls 34A1 and 34A2, respectively. The sidewalls 34A1 and 34A2 and the fringes 34A3 and 34A4 have a front end surface 342 exposed on the ABS 11S (FIG. 7 and FIG. 8).

As illustrated in FIG. 8, the second portion 34B has a plate-like bottom portion 34B1 facing the evanescent light generating surface 32C, two plate-like sidewalls 34B2 and 34B3, and fringes 34B4 and 34B5.

The third portion 34C includes a bottom portion 34C1, sidewalls 34C2 and 34C3, a wall 34C4, and fringes 34C5, 34C6, and 34C7.

As illustrated in FIG. 7 and FIG. 8, the first portion 34A, the second portion 34B, and the third portion 34C form a space inside thereof for containing the first layer 351 of the magnetic pole 35.

The surfaces of the bottom portions 34B1 and 34C1 facing the evanescent light generating surface 32C of the waveguide 32 with a predetermined distance are a first surface 341B and a second surface 341C which form a surface plasmon exciting surface 341 as illustrated in FIG. 7. In FIG. 7, the boundary between the first surface 341B and the second surface 341C is indicated by a two-dot chain line.

The magnetic pole 35 has an end surface 35T exposed on the ABS 11S as illustrated in FIG. 6 and FIG. 7. The end surface 35T includes an end surface 351T exposed at the ABS 11S in the first layer 351, and an end surface 352T exposed on the ABS 11S in the second layer 352.

The first layer 351 of the magnetic pole 35 is contained in a space formed by the first portion 34A, the second portion 34B, and the third portion 34C of the plasmon generator 34. Specifically, the first layer 351 has a first portion 351A occupying a space formed by the first portion 34A, a second portion 351B occupying a space formed by the second portion 34B, and a third portion 351C occupying a space formed by the third portion 34C. In addition, the end surface 351T of the first portion 351A has an end 35C located at a vertex opposite to the second layer 352.

The second portion 351B is closely contacted with the sidewalls 34B2 and 34B3 and the bottom portion 34B1 of the second portion 34B of the plasmon generator 34.

As illustrated in FIG. 9, in the cladding 31U, a portion disposed between the evanescent light generating surface 32C and the surface plasmon exciting surface 341 is a buffer portion 31UA. In the cladding 31U, a portion located at the rear of the plasmon generator 34 and the first layer 351 is a rear portion 31UB.

FIG. 10 is a plane view illustrating a positional relationship between the surface plasmon exciting surface 341 and the evanescent light generating surface 32C, and illustrates the plasmon generator 34 and the waveguide 32 viewed from the magnetic pole 35 side. However, as for the plasmon generator 34, only a surface facing the evanescent light generating surface 32C is illustrated, and the other surfaces are omitted in illustration. As illustrated in FIG. 10, the width of the first surface 341B in the X-axis direction becomes smaller toward the ABS 11S. The first surface 341B has a front end portion 341A3 at a position where end edges 341B1 and 341B2 in the X-axis direction intersect with each other. Angles β formed by the end edges 341B1 and 341B2 with respect to a direction (Y-axis direction) perpendicular to the ABS 11S are equal to each other. The angle β is within a range of 0 to 90 degrees, for example, and in particular, preferably within a range of 5 to 45 degrees. Note that the above-described configurations of the waveguide 32, the plasmon generator 34, and the magnetic pole 35 are merely examples, and the other configurations may be adopted as long as the laser light is combined to the waveguide to heat the magnetic disk. Even with such a configuration, a thermally-assisted magnetic head device which is excellent in long-term stability and is suitable for high density recording is achievable by the following manufacturing method.

[3. Method of Manufacturing Magnetic Head Device]

In addition to FIG. 4, referring to FIGS. 11 to 15, the method of manufacturing the magnetic head device 4A will be described. FIGS. 11 to 15 are perspective views each illustrating a process in the method of manufacturing the magnetic head device 4A.

(3-1. Method of Manufacturing Magnetic Read Write Head Section)

Figure 11:
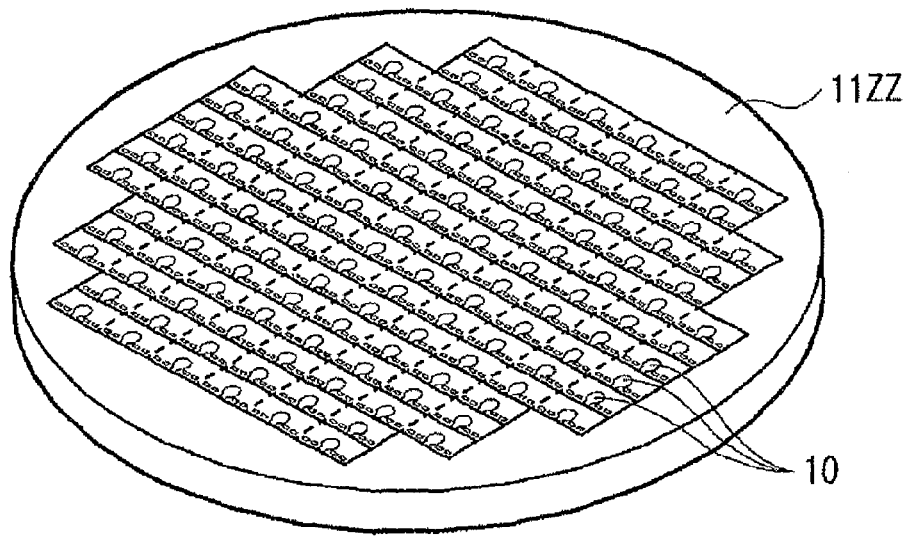
FIG. 11 is a perspective view illustrating a process in a method of manufacturing the thermally-assisted magnetic head device illustrated in FIG. 1.

First, as illustrated in FIG. 11, a wafer 11ZZ made of, for example, AlTiC is prepared. The wafer 11ZZ is to be a plurality of sliders 11 eventually. After that, a plurality of magnetic read write head section 10 is formed in an array on the wafer 11ZZ as described below.

The magnetic read write head section 10 is mainly manufactured by subsequently forming and stacking a series of components by using an existing thin film process. Examples of the existing thin film process include a film forming technique such as electrolytic plating and sputtering, patterning technique such as photolithography, etching technique such as dry etching and wet etching, and polishing technique such as chemical mechanical polishing (CMP).

Herein, first, the insulating layer 13 is formed on the slider 11. Next, the lower shield layer 21, the MR element 22 and the insulating layer 24, and the upper shield layer 23 are formed by stacking in this order on the insulating layer 13 to form the read head section 14. Subsequently, the insulating layer 25, the intermediate shield layer 26, and the insulating layer 27 are stacked in order on the read head section 14.

After that, the lower yoke layer 28, the leading shield 29 and the connecting layer 30, the cladding 31L, the waveguide 32, the claddings 33A and 33B, the cladding 31U, the plasmon generator 34, the magnetic pole 35, and the connecting layers 36 and 37 are formed in order on the insulating layer 27. Note that the formation of the leading shield 29 may be omitted. Further, by performing a planarization process after the insulating layer 38 is formed to cover the entire surface, the upper surfaces of the magnetic pole 35, the insulating layer 38, and the connecting layer 37 are planarized. Subsequently, the coil 41 embedded by the insulating layers 39 and 42 is formed. Moreover, the upper yoke layer 43 connected with the magnetic pole 35 and the connecting layer 37 is formed to complete the write head section 16. After that, the cladding 17 is formed on the write head section 16, and by using CMP or the like, the side surface of the stacked structure from the slider 11 to the cladding 17 is totally polished to form the ABS 11S. As a result, the plurality of magnetic read write head sections 10 is formed in an array on the wafer 11ZZ (FIG. 11).

Figure 12:
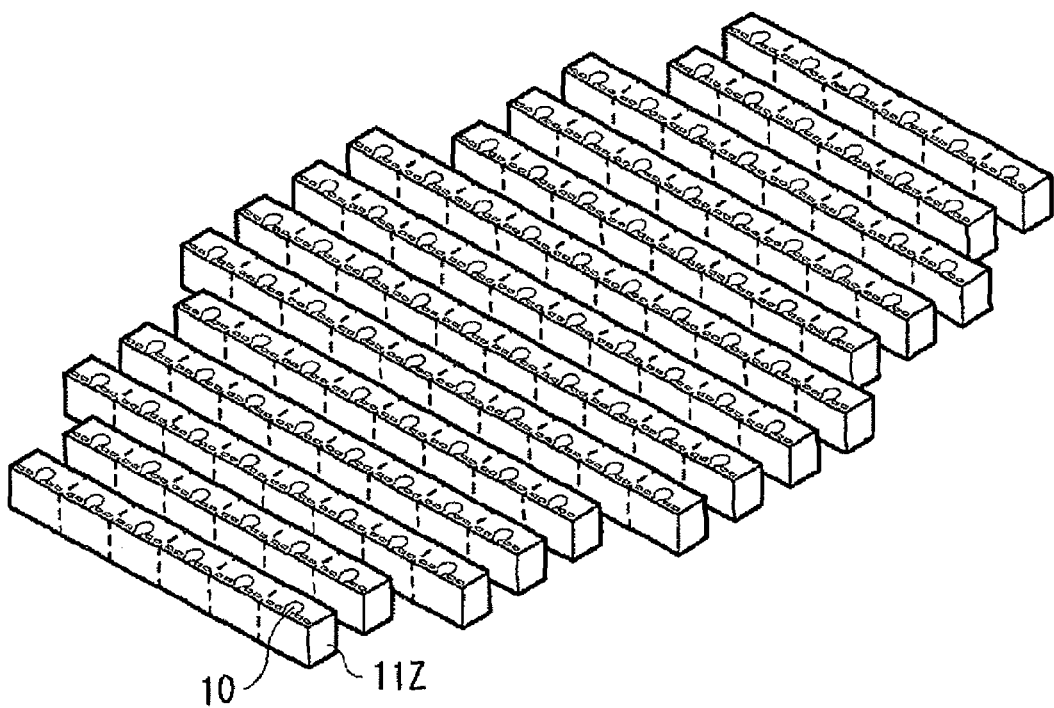
FIG. 12 is a perspective view illustrating a process following the process of FIG. 11.

After that, as illustrated in FIG. 12, the wafer 11ZZ is cut to form a plurality of bars 11Z. The plurality of magnetic read write head sections 10 is formed in line in each bar 11Z. Further, one side surface of the bar 11Z is mechanically polished, and is then selectively etched by using the photolithography or the like to form the ABS 11S. As needed, a protective film formed of DLC or the like is formed to cover the ABS 11S.

(3-2. Method of Bonding Slider to Light Source Unit)

Figure 13:
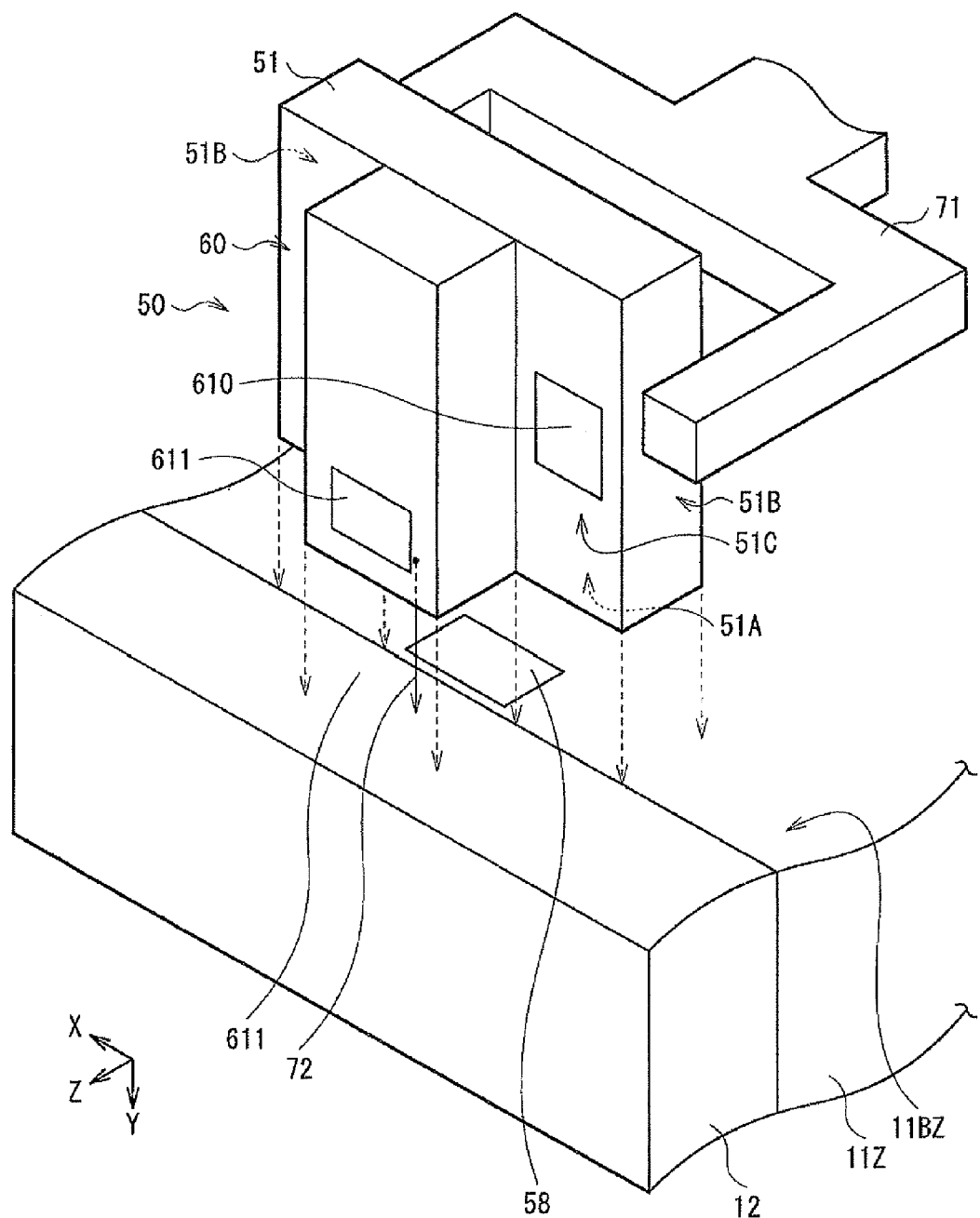
FIG. 13 is a perspective view illustrating a process following the process of FIG. 12.
Figure 15:
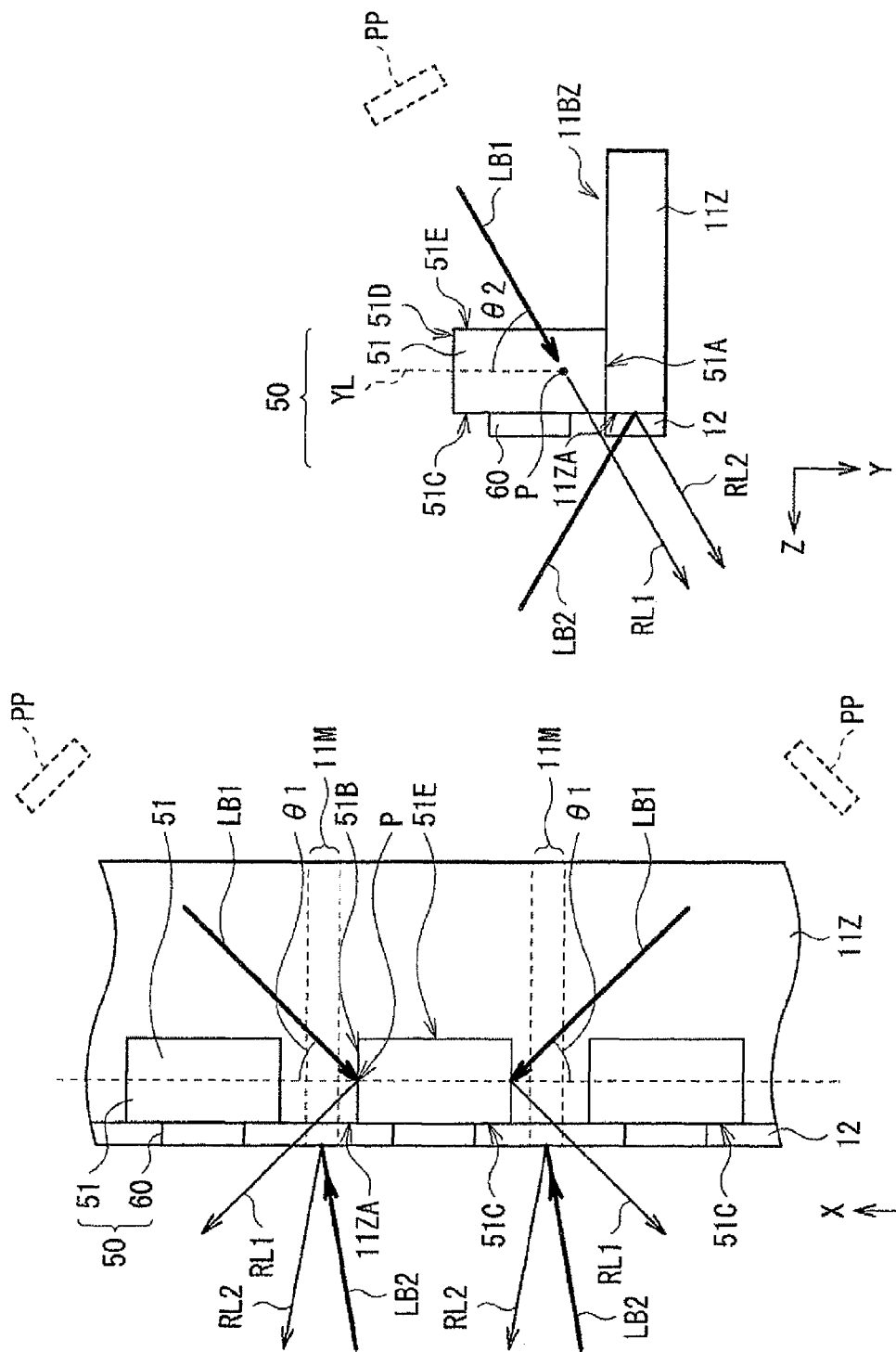
FIG. 15 is perspective views illustrating a process following the process of FIG. 14.

Next, the light source units 50 are provided to be bonded to the bar 11Z at respective predetermined positions as described below (refer to FIG. 13).

Specifically, first, an adhesive layer 58 is formed by, for example, evaporation method on a predetermined position of a back surface 11BZ of the bar 11Z which is to be a back surface 11B of the slider 11 eventually. The adhesive layer 58 is for bonding the light source unit 50 to the slider 11. The adhesive layer 58 is made of, for example, a solder, namely, a simple substance of Sn (tin), or an alloy containing Sn, Pb (lead), or Bi (bismuth). More specifically, an alloy including SnAu, SnCu, SnAl, SnSi, SnGe, SnMg, SnPb, SnAg, SnZn, SnBi, SnNi, SnPt, PbAu, PbMg, PbBi, BiAu or the like may be used. Note that the adhesive layer 58 may be provided on the bonding surface 51A of the supporting member 51 facing the back surface 11BZ.

The bar 11Z formed with the adhesive layer 58 is subjected to one or more cycles of heat cycle test in order to ensure reliability of the read head section 14. Specifically, a step of exposing the bar 11Z formed with the adhesive layer 58 to a low temperature environment of −50° C. to −10° C. for about 60 minutes and a step of exposing the bar 11Z formed with the adhesive layer 58 to a high temperature environment of 80° C. to 180° C. for about 60 minutes are alternately performed. After that, operation check of the read head section 14 of the magnetic read write head section 10 is preferably performed.

Subsequently, after the bar 11Z is mounted on a stage (not illustrated) of an alignment device, and the light source unit 50 is attached to a prove 71 of the alignment device. At this time, the bonding surface 51A of the supporting member 51 faces the back surface 11BZ of the bar 11Z. Next, a predetermined voltage is applied between terminal electrodes 610 and 611 of the laser diode 60 to emit a laser beam 72 from the emission center 62A (FIG. 4) of the active layer 62. At this time, the light source unit 50, and the bar 11Z and the element forming layer 12 are separated from each other with a predetermined distance, and are relatively movable in the X-axis direction (track width direction) and the Z-axis direction. In this case, while the laser beam 72 is maintained to be emitted and the light source unit 50 is moved in the X-axis direction (track width direction) and the Z-axis direction, a photodetector (not illustrated) sequentially detects near-field light NF from the end surface of the plasmon generator 34 exposed on the ABS 11S. To be more specific, the laser beam 72 from the emission center 62A enters the rear end surface 32A of the waveguide 32, propagates through the waveguide 32, and then reaches near the plasmon generator 34. Surface plasmons are generated in the plasmon generator 34, and the surface plasmons propagate toward the ABS 11S, and eventually are collected at a tip portion 34G (FIG. 5). As a result, the near-field light NF is generated from the tip portion 34G. The movement of the light source unit 50 in the X-axis direction and the Z-axis direction is stopped at the position where the intensity of the near-field light NF detected by the photodetector is the maximum. After that, while the relative position in the X-axis direction and the Z-axis direction is maintained, the light source unit 50 is moved in the Y-axis direction to come in contact with the bar 11Z through the adhesive layer 58, as illustrated in FIG. 14. Accordingly, alignment between the light source unit 50, the bar 11Z, and the element forming layer 12 is completed.

Subsequently, as illustrated in FIGS. 15A and 15B, a laser beam LB1 with a predetermined wavelength which passes through the supporting member 51 is applied to the both side surfaces 51B of the supporting member 51. As the laser beam LB1, for example, Nd-YAG laser light (□=1064 nm) may be used. Accordingly, the supporting member 51 is heated. Note that FIG. 15A is a top view of the plurality of light source units 50 arranged on the bar 11Z, viewed from the top side. FIG. 15B is a side view of a given light source unit 50 viewed from the side.

At this time, the laser beam LB1 is applied to the supporting member 51 from obliquely rearward as illustrated in FIG. 15A. In other words, the laser beam LB1 is applied in a direction having a vector component along the Z-axis direction from the back surface (the surface opposite to the light source mounting surface 51C) 51E of the supporting member 51 toward the light source mounting surface 51C. When the trajectory of the laser beam LB1 is projected on a plane (XZ plane) parallel to the back surface 11B and the bonding surface 51A, the incident direction of the laser beam LB1 forms an angle □1 with respect to the arrangement direction (the X-axis direction) of the light source units 50. Therefore, even if the protect means such as a shield plate is not provided, damage of the bar 11Z caused by reflected light RL1 of the laser beam LB1 from (the irradiated position P of) the side surface 51B is avoidable. In addition, since the laser beam LB1 is applied from the direction in which the light source mounting surface 51C is hidden, the possibility that the laser diode 60 and the terminal electrodes 610 and 611 provided on the light source mounting surface 51C are damaged by the error irradiation (due to positional deviation or the like) of the laser beam LB1 is allowed to be eliminated.

As illustrated in FIG. 15B, the laser beam LB1 is applied from the oblique upside, namely, the laser beam LB1 is applied in a direction having a vector component along the Y-axis direction from the top surface (the surface opposite to the bonding surface 51A) 51D of the supporting member 51 toward the bonding surface 51A. Therefore, compared with the case where the vector component in the Y-axis direction in the laser beam LB1 is zero, the heat energy propagating from the irradiated position P to the adhesive layer 58 is increased. In this case, the laser beam LB1 desirably enters the supporting member 51 at an angle □2 which allows the reflected light RL1 from the irradiated position P to be avoided from entering the bar 11Z and the element forming layer 12 in order to prevent the bar 11Z and the element forming layer 12 from being damaged by the reflected light RL1. Note that the angle □2 is an angle formed by an incident direction of the laser beam LB1 with respect to the Y-axis direction which is orthogonal to the bonding surface 51A and the back surface 11B.

Together with the irradiation of the supporting member 51 with the laser beam LB1, a laser beam LB2 is applied to the bar 11Z (FIGS. 15A and 15B). Accordingly, the bar 11Z is heated. The laser beam LB2 is preferably applied to a surface 11ZA provided with the element forming layer 12 of the bar 11Z, namely, to a surface which is to be the element forming surface 11A later. Therefore, as the laser beam LB2, for example, Nd-YAG laser light (λ=1064 nm) similar to the laser beam LB1, which passes through the element forming layer 12 may be used. However, the laser beam LB2 has energy lower than that of the laser beam LB1. Herein, the laser beam LB2 needs to be applied to a region where the magnetic read write head section 10 is not provided of the surface 11ZA. In particular, the laser beam LB2 is preferably applied to the surface 11ZA of a portion 11M which is to be cut when the bar 11Z is separated into a plurality of sliders 11 later, in order to surely avoid adverse affect to the plurality of magnetic read write head sections 10 provided on the bar 11Z. In addition, as illustrated in FIG. 15B, damage of the laser diode 60 due to the reflected light RL2 is avoidable by applying the laser beam LB2 to the surface 11ZA from the upper side.

The adhesive layer 58 receives energy from heat conduction from the supporting member 51 which is heated by the irradiation with the laser beam LB1 and from heat conduction from the bar 11Z which is heated by the irradiation with the laser beam LB2, and then the adhesive layer 58 melts. After that, when the irradiation with the laser beams LB1 and LB2 is stopped, the melted adhesive layer 58 becomes solid promptly. As a result, the supporting member 51 of the light source unit 50 and the slider 11 are bonded with accurate positional relationship.

In the embodiment, after the irradiation of the bar 11Z with the laser beam LB2 is initiated, the irradiation of the supporting member 51 with the laser beam LB1 is preferably initiated while the irradiation with the laser beam LB2 is continued. This is because, the adhesive layer 58 is preliminarily heated by previously applying, to the bar 11Z, the laser beam LB2 which has a relatively low energy density, and the adhesive layer 58 is efficiently melted by the subsequent irradiation with the laser beam LB1. Accordingly, the energy density of the laser beam LB1 is allowed to be reduced, and heating and thermal shock to the magnetic read write head section 10 and the laser diode 60 are allowed to be suppressed. As a result, the magnetic read write head section 10 and the laser diode 60 are avoided from being decreased in operation property. In particular, the irradiation of the supporting member 51 with the laser beam LB1 is preferably ended on ending of the irradiation of the bar 11Z with the second laser beam LB2, or is ended after the ending of the irradiation of the bar 11Z with the second laser beam LB2. This is because the decrease in the operation property of the magnetic read write head section 10 and the laser diode 60 is more surely avoidable.

The irradiation with the laser beam LB1 is performed in a quite short time of about 1 to 50 ms, for example. Therefore, heat effect to the magnetic read write head section 10 embedded in the element forming layer 12 is avoidable. In addition, the laser beam LB1 is desirably applied not to the back surface 11BZ of the bar 11Z but to the side surface 51B of the supporting member 51 with all amount in order to prevent the bar 11Z from being damaged. Note that the angle θ2 may be 0°. In this case, the irradiated position P is lowered in position (close to the back surface 11BZ) so that the adhesive layer 58 is efficiently heated. Moreover, only S-polarized light may be applied as the laser beam LB1. In this case, a polarizing plate PP is arranged between the light source (not illustrated) and the supporting member 51 to block P-polarized light, and the S-polarized light is allowed to enter the supporting member 51 at a Brewster's angle (for example 75°) which is determined from the refractive index of a material (for example, Si) corresponding to the wavelength of the laser beam LB1. As a result, generation of the reflected light RL on the irradiated plane (side surface 51B) is allowed to be prevented. Moreover, to prevent the generation of the reflected light on the side surface 51B, the side surface 51B may be a rough surface (for example, surface roughness Rz=0.2 to 0.8 μm).

In such a way, the manufacture of the magnetic head device 4A is completed.

[Control Circuit of Magnetic Disk Unit]

Next, referring to FIG. 16, the circuit configuration of the control circuit of the magnetic disk unit illustrated in FIG. 1 and the operation of the magnetic read write head section 10 will be described below. The control circuit includes a control LSI (large-scale integration) 100, a ROM (read only memory) 101 connected to the control LSI 100, a write gate 111 connected to the control LSI 100, and a write circuit 112 connecting the write gate 111 to the coil 41. The control circuit further includes a constant current circuit 121 connected to the MR element 22 and the control LSI 100, an amplifier 122 connected to the MR element 22, and a demodulation circuit 123 connected to the output end of the amplifier 122 and the control LSI 100. The control circuit further includes a laser control circuit 131 connected to the laser diode 60 and the control LSI 100, and a temperature detector 132 connected to the control LSI 100.

Herein, the control LSI 100 provides write data and a write control signal to the write gate 111. Moreover, the control LSI 100 provides a read control signal to the constant current circuit 121 and the demodulation circuit 123, and receives read data output from the demodulation circuit 123. In addition, the control LSI 100 provides a laser ON/OFF signal and an operation current control signal to the laser control circuit 131.

The temperature detector 132 detects the temperature of the magnetic recording layer of the magnetic disk 2 to transmit information of the temperature to the control LSI 100.

The ROM 101 stores a control table and the like to control an operation current value to be supplied to the laser diode 60.

At the time of write operation, the control LSI 100 supplies the write data to the write gate 111. The write gate 111 supplies the write data to the write circuit 112 only when the write control signal instructs write operation. The write circuit 112 allows the write current to flow through the coil 41 according to the write data. As a result, write magnetic field is generated from the magnetic pole 35, and data is written into the magnetic recording layer of the magnetic disk 2 by the write magnetic field.

At the time of read operation, the constant current circuit 121 supplies a constant sense current to the MR element 22 only when the read control signal instructs the read operation. The output voltage of the MR element 22 is amplified by the amplifier 122, and is then received by the demodulation circuit 123. The demodulation circuit 123 demodulates the output of the amplifier 122 to generate read data to be provided to the control LSI 100 when the read control signal instructs the read operation.

The laser control circuit 131 controls the supply of the operation current to the laser diode 60 based on the laser ON/OFF signal, and controls the value of the operation current supplied to the laser diode 60 based on the operation current control signal. The operation current larger than an oscillation threshold value is supplied to the laser diode 60 by the control of the laser control circuit 131 when the laser ON/OF signal instructs the ON operation. As a result, the laser beam is emitted from the laser diode 60 and then propagates through the waveguide 32. Subsequently, the near-field light NF (described later) is generated from the tip portion 34G of the plasmon generator 34, a part of the magnetic recording layer of the magnetic disk 2 is heated by the near-field light NF, and thus the coercivity in the heated part is lowered. At the time of writing, the write magnetic field generated from the magnetic pole 35 is applied to the part of the magnetic recording layer with lowered coercivity, and therefore data recording is performed.

The control LSI 100 determines the value of the operation current of the laser diode 60 with reference to the control table stored in the ROM 101, based on the temperature and the like of the magnetic recording layer of the magnetic disk 2 measured by the temperature detector 132, and controls the laser control circuit 131 with use of the operation current control signal so that the operation current of the value is supplied to the laser diode 60. The control table includes, for example, the oscillation threshold value of the laser diode 60 and data indicating temperature dependency of light output-operation current property. The control table may further include data indicating a relationship between the operation current value and the increased amount of the temperature of the magnetic recording layer heated by the near-field light NF, and data indicating temperature dependency of the coercivity of the magnetic recording layer.

Figure 16:
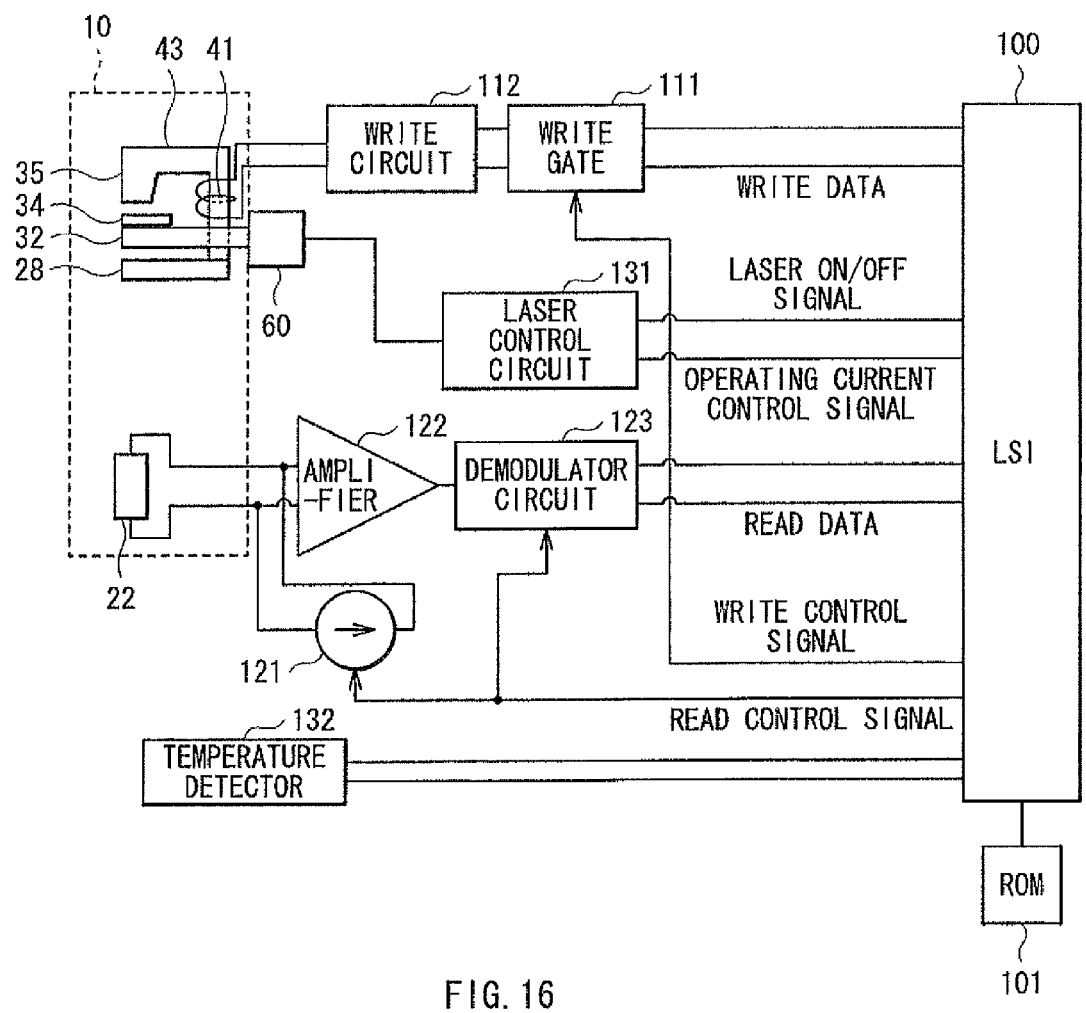
FIG. 16 is a block diagram illustrating a circuit configuration of the magnetic disk unit illustrated in FIG. 1.

The control circuit illustrated in FIG. 16 has a signal system for controlling the laser diode 60, that is, a signal system of the laser ON/OFF signal and the operation current control signal, independent of the control signal system of write/read operation. Therefore, various conduction modes to the laser diode 60 are allowed to be achieved, in addition to the conduction to the laser diode 60 simply operated with the write operation. Note that the configuration of the control circuit of the magnetic disk unit is not limited to that illustrated in FIG. 16.

Figure 17:
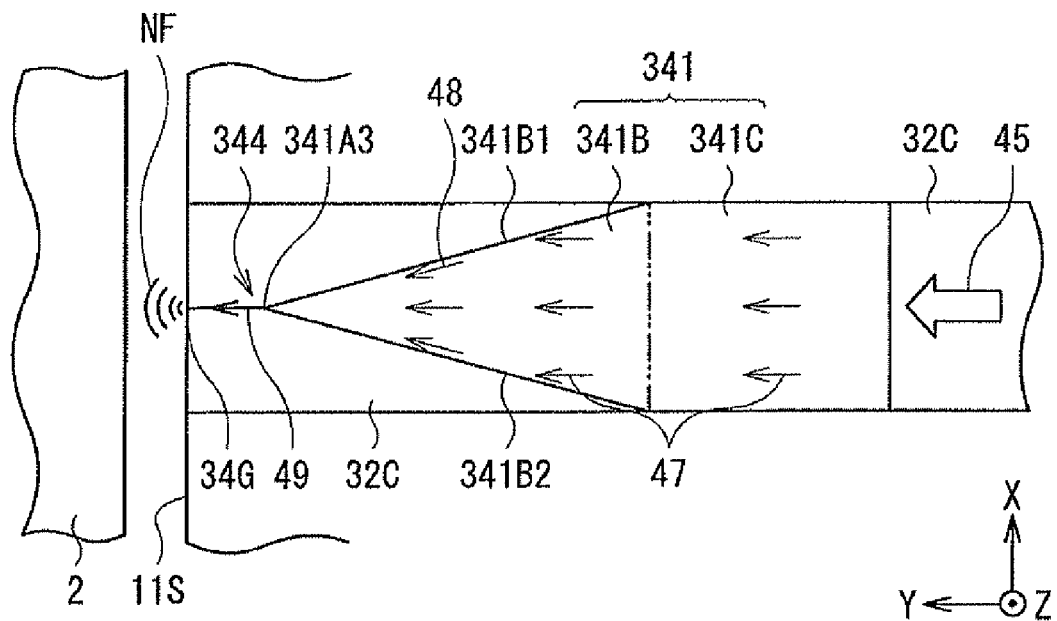
FIG. 17 is an explanatory diagram for explaining operations of the magnetic read write head section.

Subsequently, a principle of near-field light generation in the embodiment and a principle of thermally-assisted magnetic recoding with use of the near-field light will be described with reference to FIGS. 9 and 17. Similarly to FIG. 9, FIG. 17 is a plane view illustrating a positional relationship between the surface plasmon exciting surface 341 and the evanescent light generating surface 32C, and illustrates a state where the plasmon generator 34 and the waveguide 32 are viewed from the magnetic pole 35 side.

The laser beam which has been emitted from the laser diode 60 propagates through the waveguide 32 to reach near the plasmon generator 34. At this time, a laser beam 45 is totally reflected by the evanescent light generating surface 32C that is an interface between the waveguide 32 and the buffer section 33A, and therefore evanescent light 46 (FIG. 9) leaking into the buffer section 33A is generated. After that, the evanescent light 46 couples with charge fluctuation on the surface plasmon exciting surface 341 out of the outer surface of the plasmon generator 34 to induce a surface plasmon polariton mode. As a result, surface plasmons 47 (FIG. 17) are excited on the surface plasmon exciting surface 341. The surface plasmons 47 propagate on the surface plasmon exciting surface 341 toward the tip portion 34G. The first surface 341B of the surface plasmon exciting surface 341 is configured so that the width thereof in the X-axis direction becomes narrower toward the ABS 11S as described above. Accordingly, when propagating on the first surface 341B, the surface plasmons 47 are gradually converted into edge plasmons 48 (FIG. 17) as surface plasmons propagating along the edge rims 341B1 and 341B2, and the electric field intensity of the plasmons including the surface plasmons 47 and the edge plasmons 48 is increased. The surface plasmons 47 and the edge plasmons 48 are converted into edge plasmons 49 (FIG. 17) when reaching the edge 344, and the edge plasmons 49 propagate along the edge 344 toward the ABS 11S. The edge plasmons 49 eventually reach the tip portion 34G. As a result, the edge plasmons 49 are collected at the tip portion 34G to generate the near-field light NF from the tip portion 34G, based on the edge plasmons 49. The near-field light NF is irradiated toward the magnetic disk 2 and reaches the surface (recording surface) of the magnetic disk 2 to heat a part of the magnetic recording layer of the magnetic disk 2. As a result, the coercivity at the heated part of the magnetic recording layer is lowered. In the thermally-assisted magnetic recording, with respect to the part of the magnetic recording layer with the coercivity thus lowered, data recording is performed by application of the write magnetic filed generated by the magnetic pole 35.

It is considered that the following first and second principals lead to the increase of the electric field intensity of the plasmons on the first surface 341B. First, the description is made for the first principle. In the embodiment, on the metal surface of the surface plasmon exciting surface 341, the surface plasmons 47 are excited by the evanescent light 46 generated from the evanescent light generating surface 32C. The surface plasmons 47 propagate on the surface plasmon exciting surface 341 toward the tip portion 34G. The wave number of the surface plasmons 47 propagating on the first surface 341B is gradually increased with decreasing the width of the first surface 341B in the X-axis direction, that is, toward the ABS 11S. As the wave number of the surface plasmons 47 is increased, the propagating speed of the surface plasmons 47 is decreased. As a result, the energy density of the surface plasmons 47 is increased to increase the electric field intensity of the surface plasmons 47.

Next, the description is made for the second principle. When the surface plasmons 47 propagate on the surface plasmon exciting surface 341 toward the tip portion 34G, a part of the surface plasmons 47 collide with the edge rims 341B1 and 341B2 of the first surface 341B and is scattered, and accordingly a plurality of plasmons with different wave numbers is generated. A part of the plurality of the plasmons thus generated is converted into the edge plasmons 48 whose wave number is larger than that of the surface plasmons propagating on the plane. In such a way, the surface plasmons 47 are gradually converted into the edge plasmons 48 propagating along the edge rims 341B1 and 341B2, and accordingly, the electric field intensity of the edge plasmons 48 is gradually increased. In addition, the edge plasmons 48 have a larger wave number and slower propagating speed compared with the surface plasmons propagating on the plane. Therefore, the surface plasmons 47 are converted into the edge plasmons 48 to increase the energy density of the plasmons. Further, on the first surface 341B, the surface plasmons 47 are converted into the edge plasmons 48 as described above, and new surface plasmons 47 are also generated based on the evanescent light 46 emitted from the evanescent light generating surface 32C. The new surface plasmons 47 are also converted into the edge plasmons 48. In this way, the electric field intensity of the edge plasmons 48 is increased. The edge plasmons 48 are converted into the edge plasmons 49 propagating through the edge 344. Therefore, the edge plasmons 49 are obtainable which have the increased electric field intensity compared with the surface plasmons 47 at the beginning of generation.

In the embodiment, on the first surface 341B, the surface plasmons 47 propagating on the plane coexist with the edge plasmons 48 whose wave number is larger than that of the surface plasmons 47. It is considered that, on the first surface 341B, the increase of the electric field intensity of both the surface plasmons 47 and the edge plasmons 48 occurs due to the first and second principals described above. Accordingly, in the embodiment, compared with a case where one of the first and second principals is effective, the electric field intensity of the plasmons may be further increased.

In the embodiment, as described above, the light source units 50 and the sliders 11 (the bar 11Z) are bonded with the adhesive layer 58 in between by the irradiation of the supporting member 51 with the laser beam LB1 and the irradiation of the bar 11Z with the laser beam LB2. Therefore, compared with a case where the irradiation of the supporting member 51 with the laser beam LB1 is used, the above-described bonding is allowed to be performed more accurately and tightly without adversely affecting the magnetic read write head section 10 and the laser diode 60. This is because by using the irradiation of the bar 11Z with the laser beam LB2 together with the irradiation with the laser beam LB1, the adhesive layer 58 is allowed to be sufficiently melted in a shorter time without increasing the energy density of the laser beam LB1. Accordingly, in the embodiment, the thermally-assisted magnetic head device in which the positional accuracy between the light source unit 50 and the magnetic read write head section 10 is extremely high, and which is excellent in long-term stability and suitable for high density recording is achievable. Incidentally, the adverse affect to the magnetic read write head section 10 herein means disturbance of a magnetization direction of a pinned layer in the MR element 22, caused by, for example, overheating or thermal shock. In addition, the adverse affect to the laser diode 60 means a laser oscillation fault (a decrease in the energy density or a decline in stability) caused by, for example, overheating and thermal shock.

In addition, in the embodiment, the laser beam LB1 having the energy density higher than that of the laser beam LB2 is applied to the side surface 51B of the supporting member 51 from obliquely rearward direction in which the light source mounting surface 51C provided with the laser diode 60 is hidden. In the case where the laser beam LB1 is applied from the front side of the light source unit 50, the laser diode 60 provided on the light source mounting surface 51C and the terminal electrodes 610 and 611 of the laser diode 60 may be damaged by error irradiation with the laser beam LB1. However, in the embodiment, the damage caused by such error irradiation is avoidable. Incidentally, since the laser beam LB2 with respect to the bar 11Z is applied to the portion 11M to be cut which is sandwiched between the adjacent light source units 50, damage of the laser diode 60 and the like due to the error irradiation is avoidable.

EXAMPLES

Examples of the invention will be described in detail.

Examples 1 to 9

Figure 18:
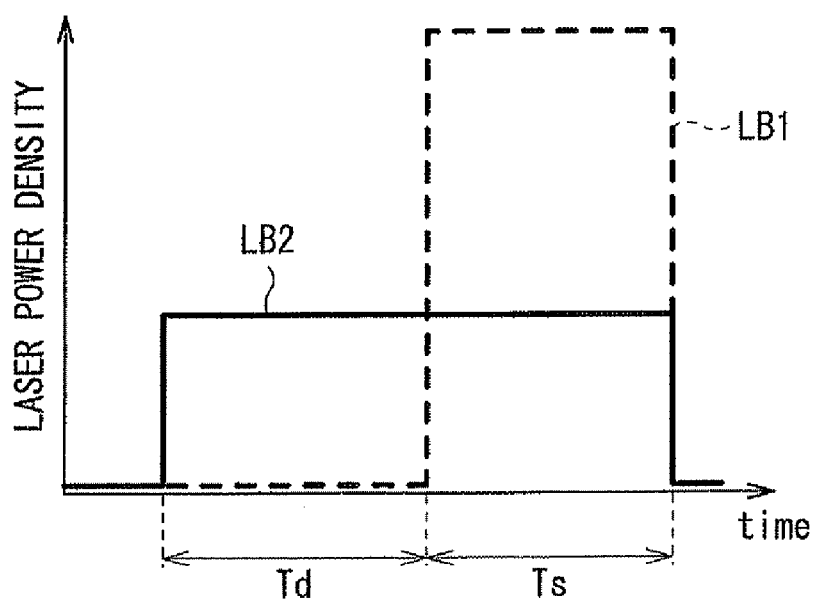
FIG. 18 is a first characteristic diagram illustrating a relationship between the elapsed time and the power density of the laser beams LB1 and LB2.

As for the magnetic head device 4A manufactured by the manufacturing method described in the above-described embodiment, the bonding strength between the supporting member 51 and the bar 11Z, and the operation property of the laser diode 60 (presence or absence of oscillation fault) were evaluated. Herein, when the supporting member 51 and the bar 11Z were bonded, the laser beam LB1 was applied to the supporting member 51 and the laser beam LB2 was applied to the bar 11Z, according to a program illustrated in FIG. 18. Specifically, after a lapse of a time Td from initiation of the irradiation of the bar 11Z with the laser beam LB2, the irradiation with the laser beam LB1 was initiated. After a lapse of a time Ts from the initiation of the irradiation with the laser beam LB1, the irradiation with both the laser beams LB1 and LB2 was stopped at a time. Therefore, the irradiation time of the laser beam LB2 was a total sum of the time Ts and the time Td. Incidentally, FIG. 18 is a characteristic diagram illustrating a relationship between the elapsed time and the power density of the laser beams LB1 and LB2. The results are illustrated in Table 1 to Table 9. In the Tables, P1 indicates a power density of the laser beam LB1 applied to the supporting member 51, and P2 indicates a power density of the laser beam LB2 applied to the bar 11Z. Note that in each of Examples in the embodiment, the power densities P1 and P2 of the laser beams LB1 and LB2 are illustrated using relative values, the times Td and Ts are illustrated using relative times, and the bonding strength is illustrated using a relative value.

TABLE 1

| | P1 | P2 | Ts | Td | Bonding Strength | LD Property |
|---|---|---|---|---|---|---|
| Example 1-1 | 5 | 2 | 5 | 0 | 8 | OK |
| Example 1-2 | 5 | 2 | 5 | 5 | 7 | OK |
| Example 1-3 | 5 | 2 | 5 | 20 | 15 | OK |
| Example 1-4 | 5 | 2 | 10 | 0 | 27 | OK |
| Example 1-5 | 5 | 2 | 10 | 5 | 33 | OK |
| Example 1-6 | 5 | 2 | 10 | 20 | 32 | OK |
| Example 1-7 | 5 | 2 | 15 | 0 | 29 | OK |

TABLE 1-continued

| | P1 | P2 | Ts | Td | Bonding Strength | LD Property |
|---|---|---|---|---|---|---|
| Example 1-8 | 5 | 2 | 15 | 5 | 30 | OK |
| Example 1-9 | 5 | 2 | 15 | 20 | 31 | OK |
| Example 1-10 | 5 | 2 | 30 | 0 | 31 | OK |
| Example 1-11 | 5 | 2 | 30 | 5 | 34 | OK |
| Example 1-12 | 5 | 2 | 30 | 20 | 32 | OK |
| Example 1-13 | 5 | 2 | 50 | 0 | 34 | NG |
| Example 1-14 | 5 | 2 | 50 | 5 | 31 | NG |
| Example 1-15 | 5 | 2 | 50 | 20 | 34 | NG |

TABLE 2

| | P1 | P2 | Ts | Td | Bonding Strength | LD Property |
|---|---|---|---|---|---|---|
| Example 2-1 | 5 | 4 | 5 | 0 | 24 | OK |
| Example 2-2 | 5 | 4 | 5 | 5 | 35 | OK |
| Example 2-3 | 5 | 4 | 5 | 20 | 24 | OK |
| Example 2-4 | 5 | 4 | 10 | 0 | 69 | OK |
| Example 2-5 | 5 | 4 | 10 | 5 | 77 | OK |
| Example 2-6 | 5 | 4 | 10 | 20 | 68 | OK |
| Example 2-7 | 5 | 4 | 15 | 0 | 78 | OK |
| Example 2-8 | 5 | 4 | 15 | 5 | 76 | OK |
| Example 2-9 | 5 | 4 | 15 | 20 | 71 | OK |
| Example 2-10 | 5 | 4 | 30 | 0 | 72 | OK |
| Example 2-11 | 5 | 4 | 30 | 5 | 75 | OK |
| Example 2-12 | 5 | 4 | 30 | 20 | 68 | OK |
| Example 2-13 | 5 | 4 | 50 | 0 | 75 | NG |
| Example 2-14 | 5 | 4 | 50 | 5 | 72 | NG |
| Example 2-15 | 5 | 4 | 50 | 20 | 67 | NG |

TABLE 3

| | P1 | P2 | Ts | Td | Bonding Strength | LD Property |
|---|---|---|---|---|---|---|
| Example 3-1 | 5 | 6 | 5 | 0 | 22 | OK |
| Example 3-2 | 5 | 6 | 5 | 5 | 36 | OK |
| Example 3-3 | 5 | 6 | 5 | 20 | 28 | OK |
| Example 3-4 | 5 | 6 | 10 | 0 | 71 | OK |
| Example 3-5 | 5 | 6 | 10 | 5 | 84 | OK |
| Example 3-6 | 5 | 6 | 10 | 20 | 75 | OK |
| Example 3-7 | 5 | 6 | 15 | 0 | 89 | OK |
| Example 3-8 | 5 | 6 | 15 | 5 | 87 | OK |
| Example 3-9 | 5 | 6 | 15 | 20 | 79 | OK |
| Example 3-10 | 5 | 6 | 30 | 0 | 82 | OK |
| Example 3-11 | 5 | 6 | 30 | 5 | 83 | OK |
| Example 3-12 | 5 | 6 | 30 | 20 | 78 | OK |
| Example 3-13 | 5 | 6 | 50 | 0 | 84 | NG |
| Example 3-14 | 5 | 6 | 50 | 5 | 89 | NG |
| Example 3-15 | 5 | 6 | 50 | 20 | 78 | NG |

TABLE 4

| | P1 | P2 | Ts | Td | Bonding Strength | LD Property |
|---|---|---|---|---|---|---|
| Example 4-1 | 10 | 2 | 5 | 0 | 21 | OK |
| Example 4-2 | 10 | 2 | 5 | 5 | 26 | OK |
| Example 4-3 | 10 | 2 | 5 | 20 | 25 | OK |
| Example 4-4 | 10 | 2 | 10 | 0 | 59 | OK |
| Example 4-5 | 10 | 2 | 10 | 5 | 53 | OK |
| Example 4-6 | 10 | 2 | 10 | 20 | 58 | OK |
| Example 4-7 | 10 | 2 | 15 | 0 | 53 | OK |
| Example 4-8 | 10 | 2 | 15 | 5 | 56 | OK |
| Example 4-9 | 10 | 2 | 15 | 20 | 57 | OK |
| Example 4-10 | 10 | 2 | 30 | 0 | 59 | NG |
| Example 4-11 | 10 | 2 | 30 | 5 | 52 | NG |
| Example 4-12 | 10 | 2 | 30 | 20 | 53 | NG |
| Example 4-13 | 10 | 2 | 50 | 0 | 58 | NG |

TABLE 4-continued

| | P1 | P2 | Ts | Td | Bonding Strength | LD Property |
|---|---|---|---|---|---|---|
| Example 4-14 | 10 | 2 | 50 | 5 | 59 | NG |
| Example 4-15 | 10 | 2 | 50 | 20 | 54 | NG |

TABLE 5

| | P1 | P2 | Ts | Td | Bonding Strength | LD Property |
|---|---|---|---|---|---|---|
| Example 5-1 | 10 | 4 | 5 | 0 | 35 | OK |
| Example 5-2 | 10 | 4 | 5 | 5 | 42 | OK |
| Example 5-3 | 10 | 4 | 5 | 20 | 43 | OK |
| Example 5-4 | 10 | 4 | 10 | 0 | 99 | OK |
| Example 5-5 | 10 | 4 | 10 | 5 | 103 | OK |
| Example 5-6 | 10 | 4 | 10 | 20 | 104 | OK |
| Example 5-7 | 10 | 4 | 15 | 0 | 99 | NG |
| Example 5-8 | 10 | 4 | 15 | 5 | 101 | NG |
| Example 5-9 | 10 | 4 | 15 | 20 | 106 | NG |
| Example 5-10 | 10 | 4 | 30 | 0 | 101 | NG |
| Example 5-11 | 10 | 4 | 30 | 5 | 99 | NG |
| Example 5-12 | 10 | 4 | 30 | 20 | 102 | NG |
| Example 5-13 | 10 | 4 | 50 | 0 | 103 | NG |
| Example 5-14 | 10 | 4 | 50 | 5 | 103 | NG |
| Example 5-15 | 10 | 4 | 50 | 20 | 103 | NG |

TABLE 6

| | P1 | P2 | Ts | Td | Bonding Strength | LD Property |
|---|---|---|---|---|---|---|
| Example 6-1 | 10 | 6 | 5 | 0 | 31 | OK |
| Example 6-2 | 10 | 6 | 5 | 5 | 41 | OK |
| Example 6-3 | 10 | 6 | 5 | 20 | 45 | OK |
| Example 6-4 | 10 | 6 | 10 | 0 | 102 | OK |
| Example 6-5 | 10 | 6 | 10 | 5 | 109 | OK |
| Example 6-6 | 10 | 6 | 10 | 20 | 118 | OK |
| Example 6-7 | 10 | 6 | 15 | 0 | 121 | NG |
| Example 6-8 | 10 | 6 | 15 | 5 | 115 | NG |
| Example 6-9 | 10 | 6 | 15 | 20 | 112 | NG |
| Example 6-10 | 10 | 6 | 30 | 0 | 128 | NG |
| Example 6-11 | 10 | 6 | 30 | 5 | 117 | NG |
| Example 6-12 | 10 | 6 | 30 | 20 | 121 | NG |
| Example 6-13 | 10 | 6 | 50 | 0 | 129 | NG |
| Example 6-14 | 10 | 6 | 50 | 5 | 122 | NG |
| Example 6-15 | 10 | 6 | 50 | 20 | 118 | NG |

TABLE 7

| | P1 | P2 | Ts | Td | Bonding Strength | LD Property |
|---|---|---|---|---|---|---|
| Example 7-1 | 15 | 2 | 5 | 0 | 21 | OK |
| Example 7-2 | 15 | 2 | 5 | 5 | 38 | OK |
| Example 7-3 | 15 | 2 | 5 | 20 | 31 | OK |
| Example 7-4 | 15 | 2 | 10 | 0 | 73 | OK |
| Example 7-5 | 15 | 2 | 10 | 5 | 81 | OK |
| Example 7-6 | 15 | 2 | 10 | 20 | 79 | OK |
| Example 7-7 | 15 | 2 | 15 | 0 | 74 | NG |
| Example 7-8 | 15 | 2 | 15 | 5 | 76 | NG |
| Example 7-9 | 15 | 2 | 15 | 20 | 71 | NG |
| Example 7-10 | 15 | 2 | 30 | 0 | 71 | NG |
| Example 7-11 | 15 | 2 | 30 | 5 | 73 | NG |
| Example 7-12 | 15 | 2 | 30 | 20 | 72 | NG |
| Example 7-13 | 15 | 2 | 50 | 0 | 78 | NG |
| Example 7-14 | 15 | 2 | 50 | 5 | 69 | NG |
| Example 7-15 | 15 | 2 | 50 | 20 | 66 | NG |

TABLE 8

| | P1 | P2 | Ts | Td | Bonding Strength | LD Property |
|---|---|---|---|---|---|---|
| Example 8-1 | 15 | 4 | 5 | 0 | 35 | OK |
| Example 8-2 | 15 | 4 | 5 | 5 | 34 | OK |
| Example 8-3 | 15 | 4 | 5 | 20 | 44 | OK |
| Example 8-4 | 15 | 4 | 10 | 0 | 115 | OK |
| Example 8-5 | 15 | 4 | 10 | 5 | 129 | OK |
| Example 8-6 | 15 | 4 | 10 | 20 | 118 | OK |
| Example 8-7 | 15 | 4 | 15 | 0 | 121 | NG |
| Example 8-8 | 15 | 4 | 15 | 5 | 123 | NG |
| Example 8-9 | 15 | 4 | 15 | 20 | 129 | NG |
| Example 8-10 | 15 | 4 | 30 | 0 | 118 | NG |
| Example 8-11 | 15 | 4 | 30 | 5 | 121 | NG |
| Example 8-12 | 15 | 4 | 30 | 20 | 129 | NG |
| Example 8-13 | 15 | 4 | 50 | 0 | 119 | NG |
| Example 8-14 | 15 | 4 | 50 | 5 | 118 | NG |
| Example 8-15 | 15 | 4 | 50 | 20 | 125 | NG |

TABLE 9

| | P1 | P2 | Ts | Td | Bonding Strength | LD Characteristics |
|---|---|---|---|---|---|---|
| Example 9-1 | 15 | 6 | 5 | 0 | 34 | NG |
| Example 9-2 | 15 | 6 | 5 | 5 | 46 | NG |
| Example 9-3 | 15 | 6 | 5 | 20 | 51 | NG |
| Example 9-4 | 15 | 6 | 10 | 0 | 134 | NG |
| Example 9-5 | 15 | 6 | 10 | 5 | 128 | NG |
| Example 9-6 | 15 | 6 | 10 | 20 | 124 | NG |
| Example 9-7 | 15 | 6 | 15 | 0 | 136 | NG |
| Example 9-8 | 15 | 6 | 15 | 5 | 132 | NG |
| Example 9-9 | 15 | 6 | 15 | 20 | 139 | NG |
| Example 9-10 | 15 | 6 | 30 | 0 | 131 | NG |
| Example 9-11 | 15 | 6 | 30 | 5 | 134 | NG |
| Example 9-12 | 15 | 6 | 30 | 20 | 137 | NG |
| Example 9-13 | 15 | 6 | 50 | 0 | 129 | NG |
| Example 9-14 | 15 | 6 | 50 | 5 | 128 | NG |
| Example 9-15 | 15 | 6 | 50 | 20 | 135 | NG |

Example 10

Without the irradiation of the bar 11Z with the laser beam LB2, the bar 11Z and the supporting member 51 were bonded only by the irradiation of the supporting member 51 with the laser beam LB1. Similar to the above, the bonding strength and operation characteristics of the laser diode were evaluated. The results are illustrated in Table 10.

TABLE 10

| | P1 | P2 | T | Bonding Strength | LD Property |
|---|---|---|---|---|---|
| Example 10-1 | 5 | 0 | 5 | 1 | OK |
| Example 10-2 | 5 | 0 | 10 | 3 | OK |
| Example 10-3 | 5 | 0 | 15 | 4 | OK |
| Example 10-4 | 5 | 0 | 30 | 5 | OK |
| Example 10-5 | 5 | 0 | 50 | 5 | OK |
| Example 10-6 | 10 | 0 | 5 | 3 | OK |
| Example 10-7 | 10 | 0 | 10 | 7 | OK |
| Example 10-8 | 10 | 0 | 15 | 21 | OK |
| Example 10-9 | 10 | 0 | 30 | 20 | OK |
| Example 10-10 | 10 | 0 | 50 | 21 | OK |
| Example 10-11 | 15 | 0 | 5 | 7 | OK |
| Example 10-12 | 15 | 0 | 10 | 21 | OK |
| Example 10-13 | 15 | 0 | 15 | 39 | OK |
| Example 10-14 | 15 | 0 | 30 | 39 | OK |
| Example 10-15 | 15 | 0 | 50 | 37 | OK |
| Example 10-16 | 20 | 0 | 5 | 21 | OK |
| Example 10-17 | 20 | 0 | 10 | 35 | NG |
| Example 10-18 | 20 | 0 | 15 | 105 | NG |
| Example 10-19 | 20 | 0 | 30 | 107 | NG |
| Example 10-20 | 20 | 0 | 50 | 106 | NG |
| Example 10-21 | 25 | 0 | 5 | 35 | NG |
| Example 10-22 | 25 | 0 | 10 | 66 | NG |
| Example 10-23 | 25 | 0 | 15 | 110 | NG |
| Example 10-24 | 25 | 0 | 30 | 112 | NG |
| Example 10-25 | 25 | 0 | 50 | 115 | NG |

As illustrated in Tables 1 to 10, it was found that in the case where both the laser beams LB1 and LB2 were used (Tables 1 to 9), higher bonding strength was obtainable even if the power density P1 was the same, compared with the case where only the laser beam LB1 was used (Table 10). In addition, it was confirmed that the LD defect was less likely to occur even if the bonding strength was high. In other words, it was found that in the invention, the operation property of the laser diode 60 was allowed to be favorably maintained while the bonding strength between the supporting member 51 and the bar 11Z was increased. In particular, in Examples 5-4 to 5-6, 6-4 to 6-6, and 8-4 to 8-6, higher bonding strength was obtained without deteriorating the operation property of the laser diode 60.

Examples 11 to 13

Next, under the conditions of the above-described Examples 5-4 to 5-6, 6-4 to 6-8, and 8-4 to 8-6 and therearound, alignment accuracy (offset amount) and presence of occurrence of pin reverse in the pinned layer in the MR element 22 were examined. The results are illustrated in Tables 11 to 13.

TABLE 11

| | P1 | P2 | Ts | Td | Offset | Pin Reverse |
|---|---|---|---|---|---|---|
| Example 5-4 | 10 | 4 | 10 | 0 | 21 | 0% |
| Example 11-1 | 10 | 4 | 10 | 1 | 18 | 0% |
| Example 11-2 | 10 | 4 | 10 | 2 | 7 | 0% |
| Example 11-3 | 10 | 4 | 10 | 3 | 4 | 0% |
| Example 11-4 | 10 | 4 | 10 | 4 | 5 | 0% |
| Example 5-5 | 10 | 4 | 10 | 5 | 3 | 0% |
| Example 11-5 | 10 | 4 | 10 | 6 | 1 | 0% |
| Example 11-6 | 10 | 4 | 10 | 7 | 2 | 4% |
| Example 11-7 | 10 | 4 | 10 | 8 | 1 | 6% |

TABLE 12

| | P1 | P2 | Ts | Td | Offset | Pin Reverse |
|---|---|---|---|---|---|---|
| Example 6-4 | 10 | 6 | 10 | 0 | 28 | 0% |
| Example 12-1 | 10 | 6 | 10 | 1 | 23 | 0% |
| Example 12-2 | 10 | 6 | 10 | 2 | 5 | 0% |
| Example 12-3 | 10 | 6 | 10 | 3 | 2 | 0% |
| Example 12-4 | 10 | 6 | 10 | 4 | 1 | 0% |
| Example 6-5 | 10 | 6 | 10 | 5 | 4 | 3% |
| Example 12-5 | 10 | 6 | 10 | 6 | 1 | 5% |
| Example 12-6 | 10 | 6 | 10 | 7 | 2 | 6% |
| Example 12-7 | 10 | 6 | 10 | 8 | 1 | 6% |

TABLE 13

| | P1 | P2 | Ts | Td | Offset | Pin Reverse |
|---|---|---|---|---|---|---|
| Example 8-1 | 15 | 4 | 10 | 0 | 39 | 0% |
| Example 13-1 | 15 | 4 | 10 | 1 | 29 | 0% |

TABLE 13-continued

| | P1 | P2 | Ts | Td | Offset | Pin Reverse |
|---|---|---|---|---|---|---|
| Example 13-2 | 15 | 4 | 10 | 2 | 8 | 0% |
| Example 13-3 | 15 | 4 | 10 | 3 | 3 | 0% |
| Example 13-4 | 15 | 4 | 10 | 4 | 2 | 0% |
| Example 8-5 | 15 | 4 | 10 | 5 | 4 | 0% |
| Example 13-5 | 15 | 4 | 10 | 6 | 1 | 0% |
| Example 13-6 | 15 | 4 | 10 | 7 | 2 | 4% |
| Example 13-7 | 15 | 4 | 10 | 8 | 1 | 5% |

As illustrated in Tables 11 to 13, it was found that as the time Td is increased, or when the irradiation time with the laser beam LB2 was provided before the irradiation with the laser beam LB1 was initiated, the accuracy of the bonding position was improved (offset was decreased). On the other hand, if the irradiation time Td with only the laser beam LB2 was excessively long, the pin reverse was likely to occur. Therefore, it was found that the decrease of the offset and the decrease of the pin reverse were compatible by controlling the times Ts and Td.

Example 14

Subsequently, a relationship between the times Ts and Td and occurrence of the pin reverse was examined. Herein, the energy density of the laser beams LB1 and LB2 were under the same conditions as those in Examples 11-1 to 11-7, 5-4, and 5-5. The results are illustrated in Table 14.

TABLE 14

| | Ts | | | |
|---|---|---|---|---|
| Td | 10 | 12 | 14 | 16 |
| 0 | 0% | 0% | 0% | 1% |
| 1 | 0% | 0% | 0% | 6% |
| 2 | 0% | 0% | 0% | 6% |
| 3 | 0% | 0% | 6% | 10% |
| 4 | 0% | 0% | 8% | 10% |
| 5 | 0% | 5% | 9% | 15% |
| 6 | 0% | 5% | 9% | 14% |
| 7 | 4% | 9% | 9% | 16% |
| 8 | 6% | 9% | 9% | 18% |

As illustrated in Table 14, it was found that the increase of the time Ts makes it easier for the pin reverse to occur even in the short time Id.

Examples 15 and 16

Figure 19:
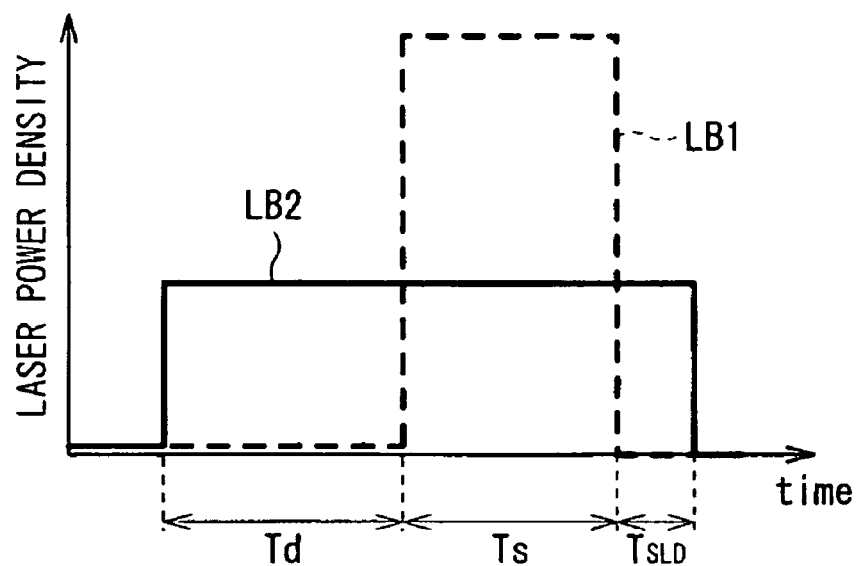
FIG. 19 is a second characteristic diagram illustrating a relationship between the elapsed time and the power density of the laser beams LB1 and LB2.
Figure 20:
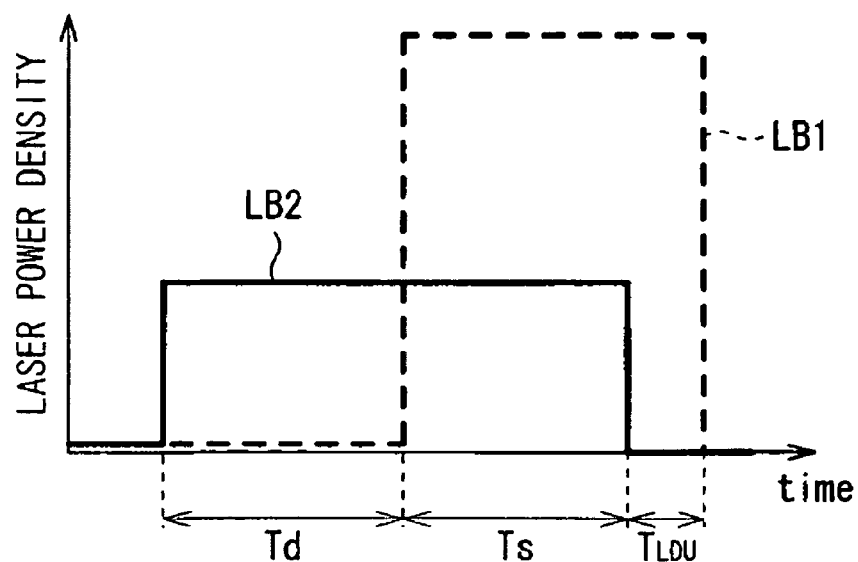
FIG. 20 is a third characteristic diagram illustrating a relationship between the elapsed time and the power density of the laser beams LB1 and LB2.

Then, it was examined whether the laser beam LB1 or the laser beam LB2 was dominant to the result in Table 14 (elevation of occurrence probability of the pin reverse due to the increase of the time Ts). Specifically, first, according to the program illustrated in FIG. 19, the bonding process was carried out by performing concurrent irradiation with the laser beams LB1 and LB2 and then performing the irradiation with only the laser beam LB2 over a time $T_{SLD}$ (Example 15). On the other hand, according to the program illustrated in FIG. 20, the bonding process was carried out by performing concurrent irradiation with the laser beams LB1 and LB2 and then performing the irradiation with only the laser beam LB1 over a time $T_{LDU}$ (Example 16). Occurrence probability of the pin reverse was examined for Examples 15 and 16. In this case, the energy density of the laser beams LB1 and LB2 was under the same condition as that in Examples 11-1 to 11-7, 5-4, and 5-5 of Table 11. The results are illustrated in Tables 15 and 16.

TABLE 15

| | $T_{SLD}$ | | | (Ts = 10) |
|---|---|---|---|---|
| Td | 0 | 2 | 4 | 6 |
| 0 | 0% | 0% | 0% | 0% |
| 1 | 0% | 0% | 0% | 5% |
| 2 | 0% | 0% | 0% | 6% |
| 3 | 0% | 0% | 6% | 8% |
| 4 | 0% | 0% | 8% | 10% |
| 5 | 0% | 5% | 9% | 12% |
| 6 | 0% | 5% | 9% | 12% |
| 7 | 4% | 9% | 9% | 15% |
| 8 | 6% | 9% | 9% | 17% |

TABLE 16

| | $T_{LDU}$ | | | (Ts = 10) |
|---|---|---|---|---|
| Td | 10 | 12 | 14 | 16 |
| 0 | 0% | 0% | 0% | 0% |
| 1 | 0% | 0% | 0% | 0% |
| 2 | 0% | 0% | 0% | 0% |
| 3 | 0% | 0% | 0% | 0% |
| 4 | 0% | 0% | 0% | 0% |
| 5 | 0% | 0% | 0% | 0% |
| 6 | 0% | 0% | 0% | 0% |
| 7 | 4% | 5% | 6% | 7% |
| 8 | 6% | 9% | 9% | 8% |

As illustrated in Table 15, in the case where the irradiation with the laser beam LB1 was stopped first (Example 15), the tendency similar to that in Example 14 was observed. On the other hand, as illustrated in Table 16, in the case where the irradiation with the laser beam LB2 was stopped first (Example 16), dependency of the occurrence probability of the pin reverse relative to the time $T_{LDU}$ was not observed. From this results, it was found that the long-term irradiation of the bar 11Z with the laser beam LB2 might adversely affect the MR element 22, and thus the irradiation time with the laser beam LB2 was desirably short as much as possible. In other words, in the viewpoint of pin-reverse suppression, it was desirable to end the irradiation of the supporting member 51 with the laser beam LB1, or, ending of the irradiation of the bar 11Z with the laser beam LB2, or after the ending of the irradiation of the bar 11Z with the laser beam LB2.

Hereinbefore, although the invention has been described with referring to the embodiment, the invention is not limited to the above-described embodiment, and various modifications may be made. For example, in the embodiment, although exemplified is a CPP-type GMR element as a read element, the read element is not limited thereto and may be a CIP (current in plane)-GMR element. In such a case, an insulating layer needs to be provided between an MR element and a lower shield layer, and between the MR element and an upper shield layer, and a pair of leads for supplying a sense current to the MR element needs to be inserted into the insulating layer. Alternatively, a TMR (tunneling magnetoresistance) element with a tunnel junction film may be used as a read element.

In addition, in the thermally-assisted magnetic recording head manufactured according to the invention, the configurations (shapes, positional relationships, and the like) of the waveguide, the plasmon generator, the magnetic pole, and the like are not limited to those described in the above-described embodiment, and any thermally-assisted magnetic recording head having other configurations may be available. Specifically, the thermally-assisted magnetic recording head manufactured according to the invention may adopt other configurations, as long as the thermally-assisted magnetic recording head includes a waveguide propagating laser light and a plasmon generator generating plasmons with use of the laser light which has propagated through the waveguide, without limitation to the waveguide 32, the plasmon generator 34, and the magnetic pole 35 illustrated in FIG. 5 and FIG. 7 to FIG. 10, for example. Moreover, the thermally-assisted magnetic recording head may has a configuration in which laser light is directly applied to a magnetic disk to be heated without using a plasmon generator. The method of manufacturing a thermally-assisted magnetic recording head according to the invention is applicable to such a thermally-assisted magnetic recording head, and is allowed to achieve a thermally-assisted magnetic head device which is excellent in long-term stability and is suitable for high density recording.

The correspondence relationships between the reference numerals and the components of the above-described embodiment are collectively illustrated here.

1 . . . housing, 2 . . . magnetic disk, 3 . . . head arm assembly (HAA), 4 . . . head gimbals assembly (HGA), 4A . . . magnetic head device, 4B . . . suspension, 5 . . . arm, 6 . . . driver, 7 . . . fixed shaft, 8 . . . bearing, 9 . . . spindle motor, 10, 10A . . . magnetic read write head section, 11 . . . slider, 11A . . . element forming surface, 11B . . . back surface, 11S . . . air bearing surface (ABS), 12 . . . element forming layer, 13 . . . insulating layer, 14 . . . read head section, 16 . . . write head section, 17 . . . cladding, 21 . . . lower shield layer, 22 . . . MR element, 23 . . . upper shield layer, 24, 25, 27, 38, 39, 42 . . . insulating layer, 28 . . . lower yoke layer, 29 . . . leading shield, 30, 36, 37 . . . connecting layer, 31L, 31U, 33A, 33B . . . cladding, 32, 72 . . . waveguide, 34 . . . plasmon generator, C34 . . . center portion, W34 . . . wing portion, 34A to 34C . . . first to third portions, 34G . . . tip portion, 34L . . . lower layer, 34U . . . upper layer, 341 . . . surface plasmon exciting surface, 344 . . . edge, 35, 75 . . . magnetic pole, 351 . . . first layer, 352 . . . second layer, 40A, 40B . . . connecting section, 41 . . . coil, 43 . . . upper yoke layer, 45 . . . laser light, 46 . . . evanescent light, 47 . . . surface plasmon, 48, 49 . . . edge plasmon, 50 . . . light source unit, 51 . . . supporting member, 51A . . . bonding surface, 51B . . . side surface, 51C . . . light source mounting surface, 58 . . . adhesive layer, 60 . . . laser diode, 61 . . . lower electrode, 62 . . . active layer, 63 . . . upper electrode, 64 . . . reflective layer, 65 . . . n-type semiconductor layer, 66 . . . p-type semiconductor layer, 71 . . . probe, LB1, LB2 . . . laser beam, NF . . . near-field light.

What is claimed is:

1. A method of manufacturing a thermally-assisted magnetic recording head, the method comprising:
    providing a bar and a plurality of light source units, the bar including a plurality of thermally-assisted magnetic recording head sections arranged in a first direction that is a longitudinal direction, and each of the light source units including a substrate and a light source mounted on the substrate;
    bonding a second surface of the substrate to the bar with an adhesive layer in between, where the plurality of light source units are so aligned to the respective thermally-assisted magnetic recording head sections on the bar, as to allow a first surface of the substrate, which supports the light source, to be parallel to the first direction, the bonding allowing the substrates of the light source units to be irradiated with a first laser beam and allowing the bar to be irradiated with a second laser beam, to thereby allow the adhesive layer to be melted; and
    separating the bar into a plurality of sliders each including one of the thermally-assisted magnetic recording head sections.

2. The method of manufacturing the thermally-assisted magnetic recording head according to claim 1, wherein the irradiation of the substrates with the first laser beam is initiated while the irradiation of the bar with the second laser beam is continued.

3. The method of manufacturing the thermally-assisted magnetic recording head according to claim 2, wherein the irradiation of the substrates with the first laser beam is ended on ending of the irradiation of the bar with the second laser beam, or is ended after the ending of the irradiation of the bar with the second laser beam.

4. The method of manufacturing the thermally-assisted magnetic recording head according to claim 1, wherein the first laser beam has energy higher than energy of the second laser beam.

5. The method of manufacturing the thermally-assisted magnetic recording head according to claim 1, wherein a surface, provided with the plurality of thermally-assisted magnetic recording head sections, of the bar is irradiated with the second laser beam.

6. The method of manufacturing the thermally-assisted magnetic recording head according to claim 1, wherein the bonding allows the adhesive layer to be melted by allowing a third surface, that intersects with both the first surface and the second surface, of the substrate to be irradiated with the first laser beam from a direction in which the first surface is hidden.

7. The method of manufacturing the thermally-assisted magnetic recording head according to claim 6, wherein the third surface is irradiated with the first laser beam from an oblique upside.

8. The method of manufacturing the thermally-assisted magnetic recording head according to claim 7, wherein the adhesive layer is formed of a simple substance of Sn (tin), or is formed of an alloy containing Sn, Pb (lead), or Bi (bismuth).

* * * * *